United States Patent
Matsuno et al.

(10) Patent No.: US 10,855,928 B2
(45) Date of Patent: Dec. 1, 2020

(54) IMAGE CAPTURE APPARATUS AND CONTROL METHOD THEREOF

(71) Applicant: CANON KABUSHIKI KAISHA, Tokyo (JP)

(72) Inventors: Keisuke Matsuno, Kawasaki (JP); Takeshi Ikeda, Tokyo (JP); Kenzo Hisa, Inagi (JP); Taketoshi Kinoshita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/253,967

(22) Filed: Jan. 22, 2019

(65) Prior Publication Data

US 2019/0238737 A1 Aug. 1, 2019

(30) Foreign Application Priority Data

Jan. 26, 2018 (JP) ................................. 2018-011846

(51) Int. Cl.
*H04N 5/235* (2006.01)
*H04N 5/225* (2006.01)
*H04N 5/232* (2006.01)

(52) U.S. Cl.
CPC ......... *H04N 5/2353* (2013.01); *H04N 5/2256* (2013.01); *H04N 5/23216* (2013.01)

(58) Field of Classification Search
CPC ............ H04N 5/2353; H04N 5/23216; H04N 5/2256; H04N 5/23219; H04N 5/2351; H04N 5/23222; H04N 5/232
See application file for complete search history.

(56) References Cited

U.S. PATENT DOCUMENTS

2012/0176041 A1* 7/2012 Birru .................... H05B 47/11
315/151
2014/0307117 A1* 10/2014 Feng ................... H04N 5/2351
348/218.1

FOREIGN PATENT DOCUMENTS

JP          05-056330 A     3/1993

* cited by examiner

*Primary Examiner* — Shahbaz Nazrul
(74) *Attorney, Agent, or Firm* — Cowan, Liebowitz & Latman, P.C.

(57) ABSTRACT

An image capture apparatus that allows the user to easily change the brightness of an image that is shot while using automatic exposure control is disclosed. The image capture apparatus comprises a setting unit configured to be able to set a reference value of proper exposure. The image capture apparatus determines exposure conditions based on the luminance information and the reference value, wherein the reference value is a value used as a reference exposure value from which exposure conditions are varied in an exposure compensation.

18 Claims, 12 Drawing Sheets

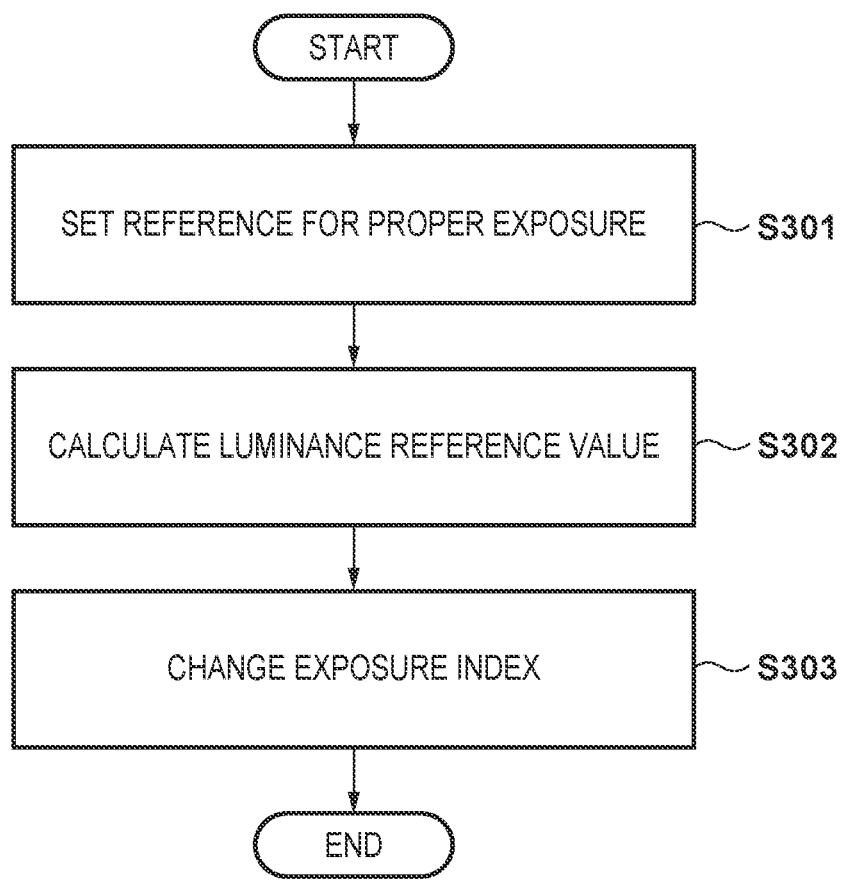

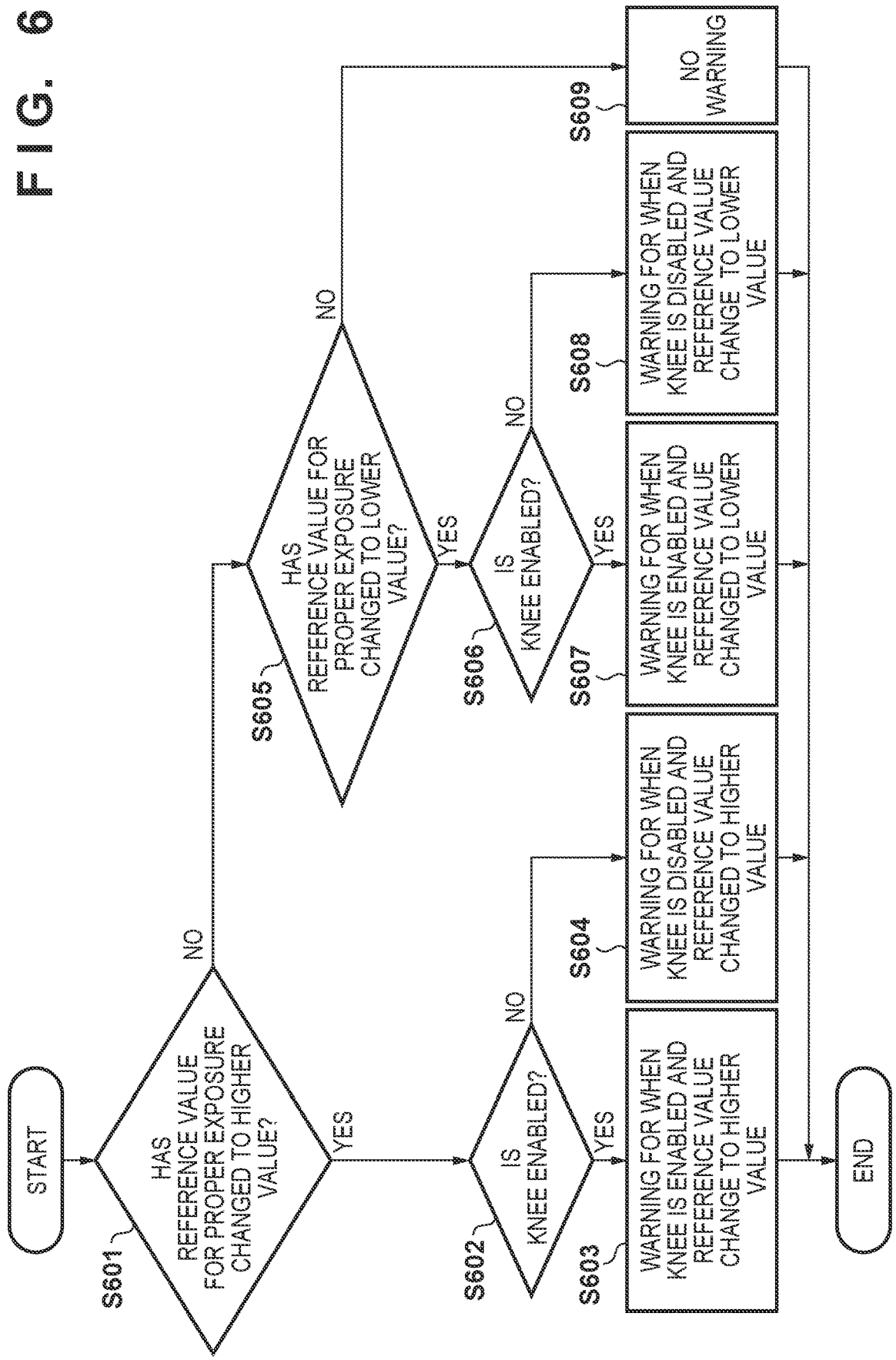

FIG. 7

| KNEE | REFERENCE VALUE FOR PROPER EXPOSURE | WARNING DISPLAY EXAMPLE |
|---|---|---|
| DISABLED | CHANGED TO LOWER VALUE | GRADATION CHARACTERISTICS IN DARK PORTION WILL DEGRADE |
| | CHANGED TO HIGHER VALUE | DYNAMIC RANGE WILL DECREASE |
| ENABLED | CHANGED TO LOWER VALUE | GRADATION CHARACTERISTICS FOR DARK PORTION WILL POSSIBLY DECREASE |
| | CHANGED TO HIGHER VALUE | GRADATION CHARACTERISTICS FOR HIGH LUMINANCE WILL DECREASE |

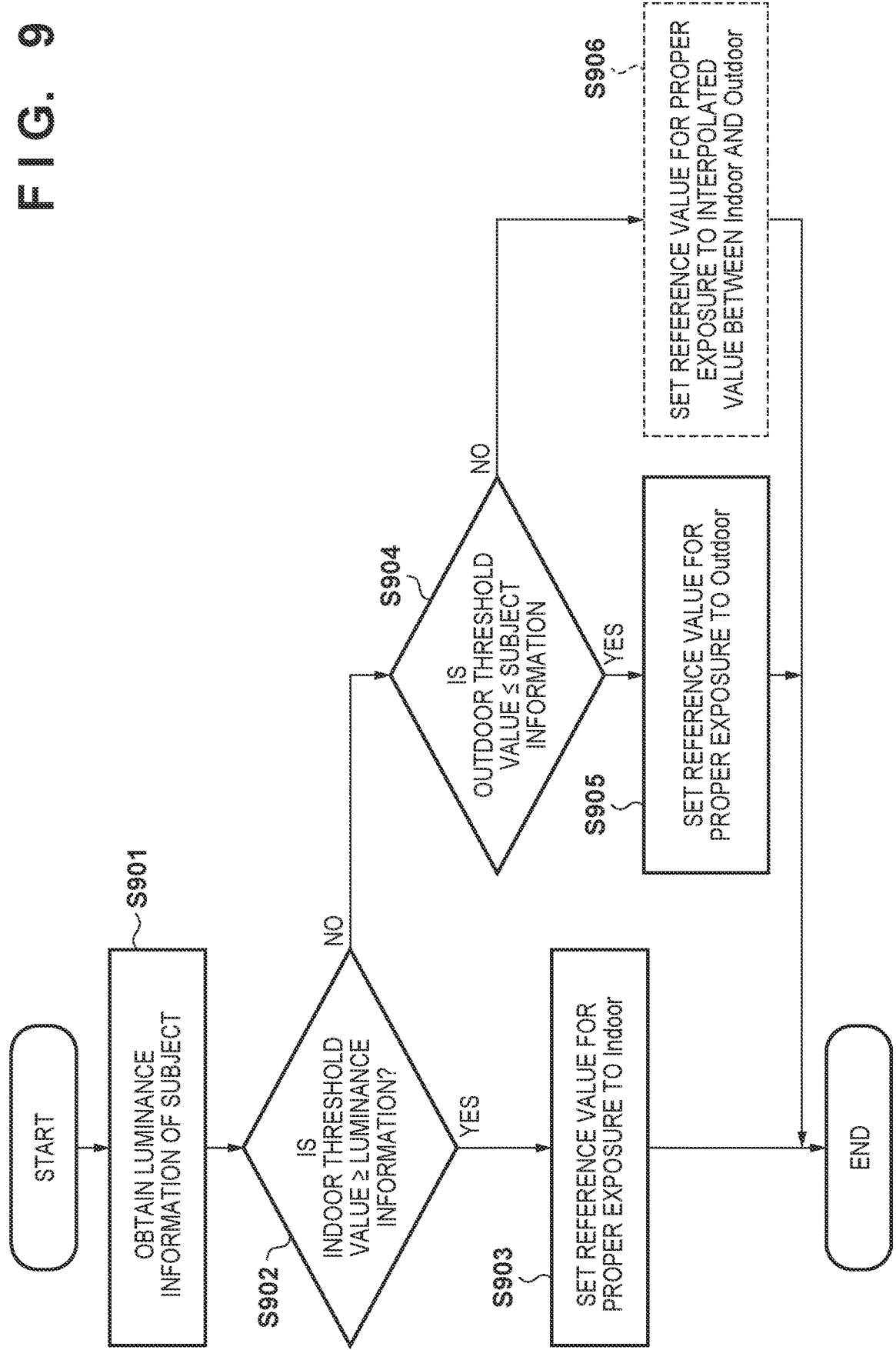

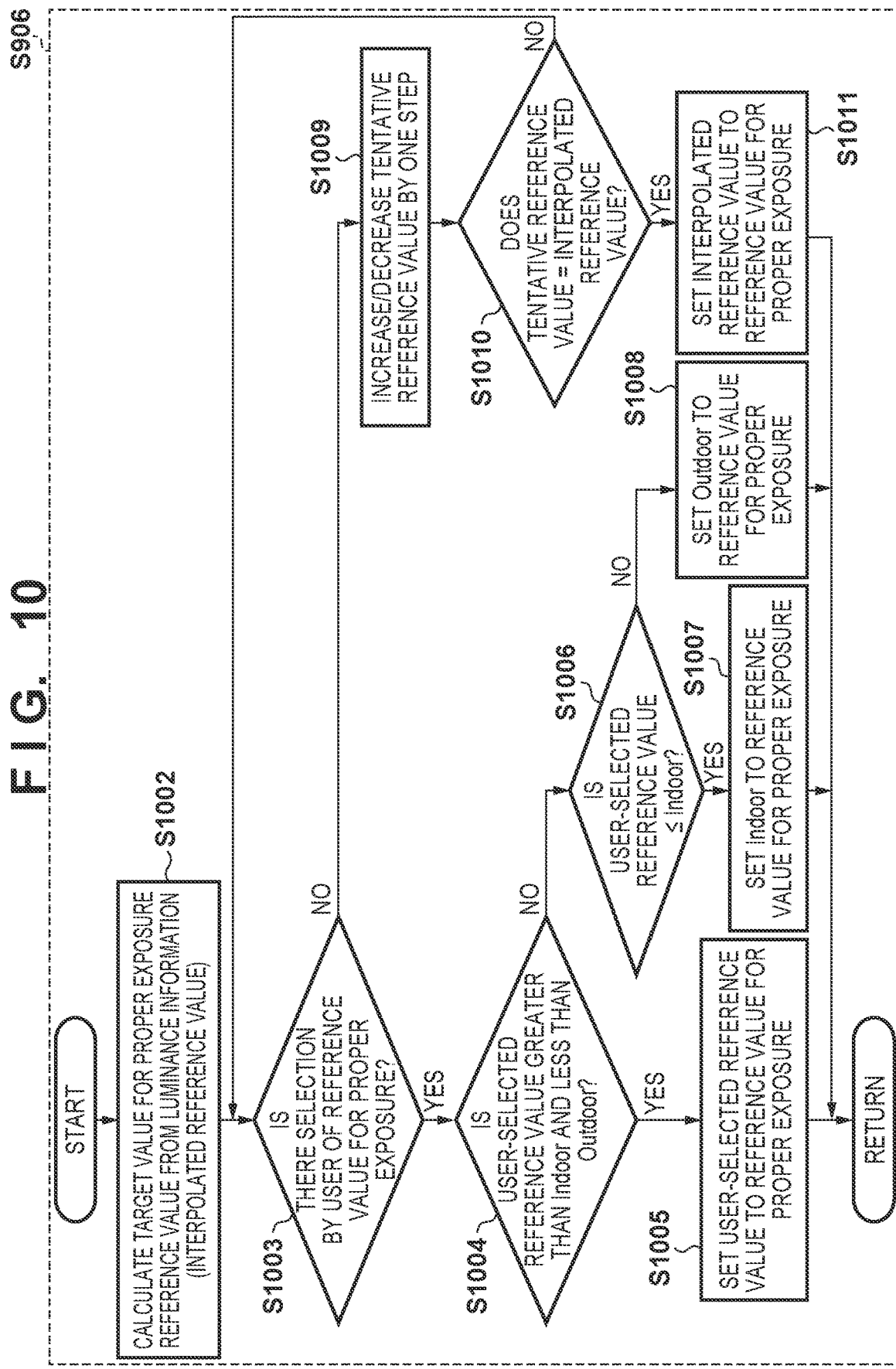

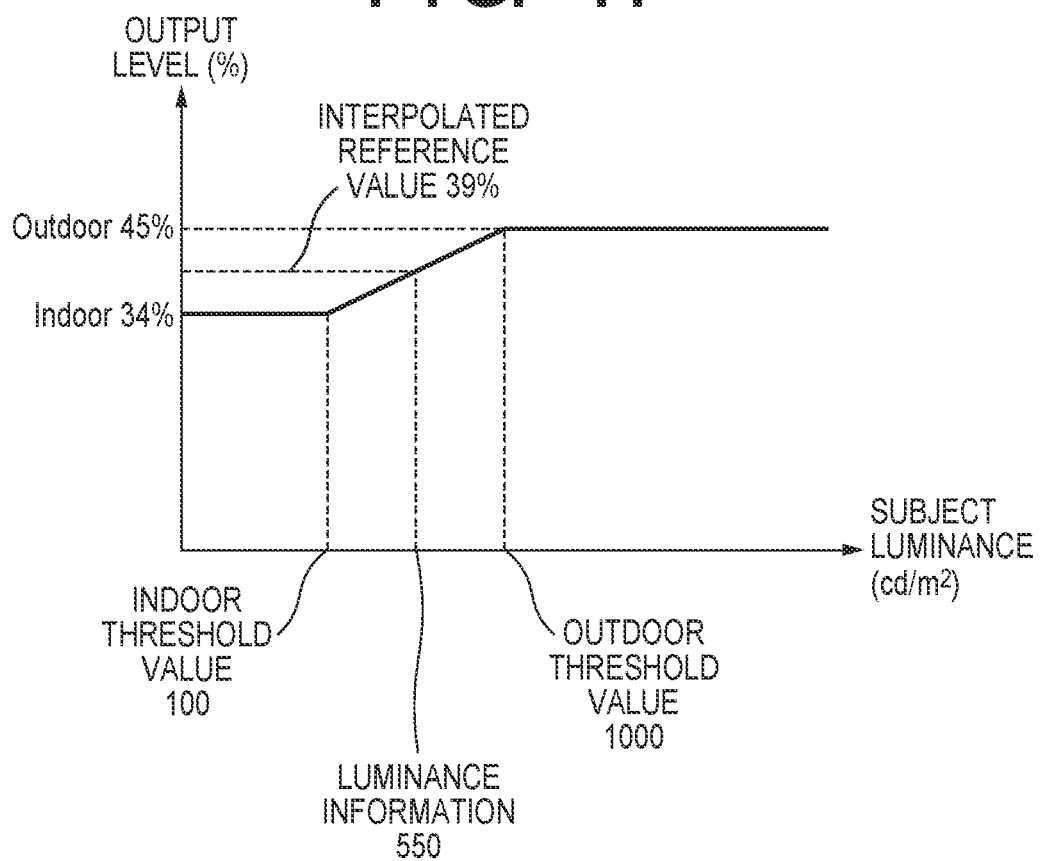

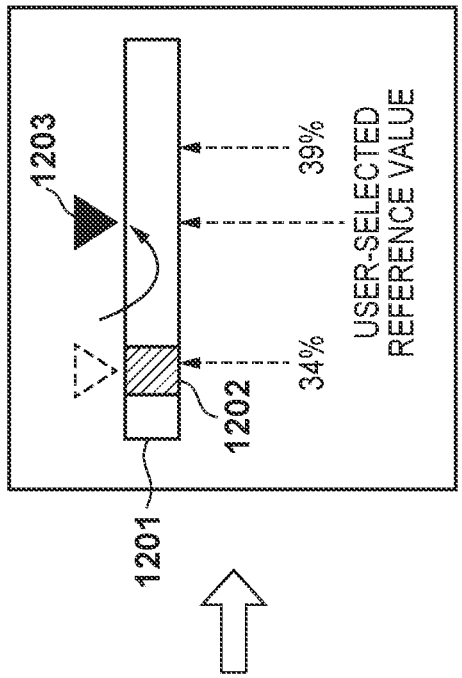
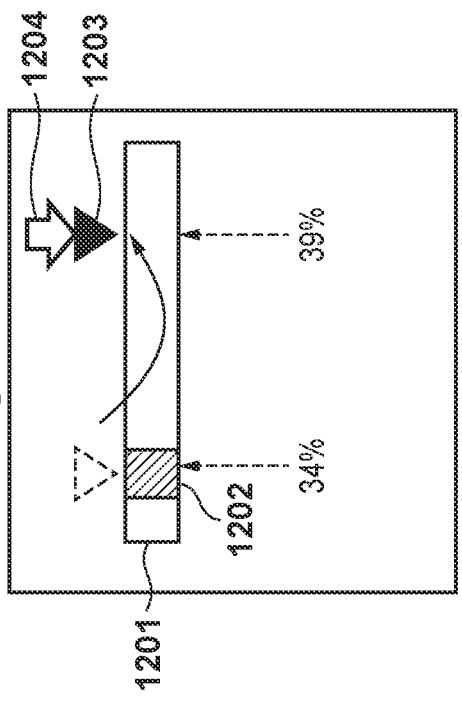
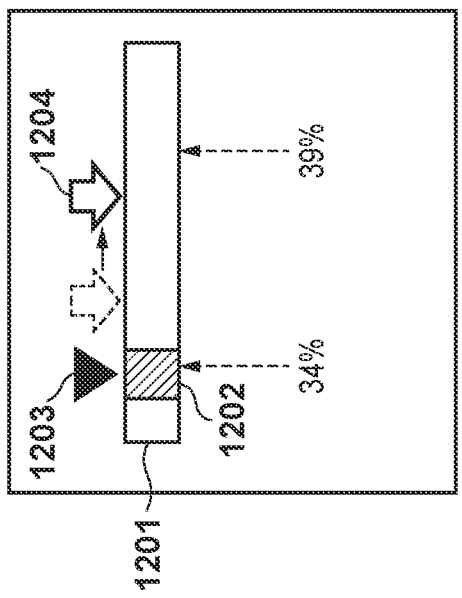

IMAGE CAPTURE APPARATUS AND CONTROL METHOD THEREOF

BACKGROUND OF THE INVENTION

Field of the Invention

The present invention relates to an image capture apparatus and a control method thereof.

Description of the Related Art

Ordinary image capture apparatuses have an automatic exposure control (AE) function for automatically determining proper exposure conditions. In addition, a function for presenting the difference between exposure conditions that are currently set and proper exposure conditions acquired through automatic exposure control in order to support manual exposure control is also known. Note that, for example, proper exposure conditions can be determined by referring to, using measured subject luminance, an exposure program chart in which exposure conditions that are proper for each subject luminance (combination of an aperture value, a shutter speed, and shooting sensitivity) are prescribed in advance.

In ordinary automatic exposure control, exposure conditions under which an achromatic color subject with reflectance of 18% has appropriate brightness (an output level) are determined. The exposure conditions that are determined in this manner are appropriate for most shooting. However, there have been cases where appropriate exposure conditions cannot be determined regarding scenes in which a main subject is against a very bright background such as a backlit scene and a snow scene.

In such cases, exposure compensation is necessary, but if exposure compensation is set and shooting is performed, and, after that, resetting the exposure compensation is forgotten, there have been cases where shooting is performed in the state where a scene for which exposure compensation is not necessary is under exposure compensation. In addition, certain knowledge and operation proficiency are necessary in order to perform exposure compensation of an appropriate amount.

For example, Japanese Patent Laid-Open No. H5-56330 discloses an image capture apparatus that supports shooting in a scene inappropriate for ordinary automatic exposure control, by setting a shooting mode for a sand beach, a snow scene, and the like, and thereby collectively changing a plurality of parameters such as an aperture value and a shutter speed, and a light metering method.

However, since a shooting mode is for shooting a specific subject and scene, and a plurality of parameters are collectively changed, it is not easy to perform shooting under exposure conditions intended by the user. For example, if the user can easily change a reference value of proper exposure that is used in automatic exposure control, brightness of an image can be changed without exposure compensation while performing shooting with proper exposure through automatic exposure control, but such a mechanism has not been provided.

SUMMARY OF THE INVENTION

According to the present invention, an image capture apparatus that allows the user to easily change the brightness of an image that is shot while using automatic exposure control, and a control method of the image capture apparatus are provided.

According to an aspect of the present invention, there is provided an image capture apparatus comprising: at least one processor that functions, when executes a program stored in a memory, as: a setting unit configured to be able to set a reference value of proper exposure; an obtaining unit configured to obtain luminance information of a subject; and a determination unit configured to determine exposure conditions based on the luminance information and the reference value, wherein the reference value is a value used as a reference exposure value from which exposure conditions are varied in an exposure compensation.

According to another aspect of the present invention, there is provided a method of controlling an image capture apparatus, comprising: setting a reference value of proper exposure; obtaining luminance information of a subject; and determining exposure conditions based on the luminance information and the reference value, wherein the reference value is a value used as a reference exposure value from which exposure conditions are varied in an exposure compensation.

According to a further aspect of the present invention, there is provided a non-transitory computer-readable storage medium storing a computer-executable program for executing a method of controlling an image capture apparatus, wherein the method comprises: setting a reference value of proper exposure; obtaining luminance information of a subject; and determining exposure conditions based on the luminance information and the reference value, wherein the reference value is a value used as a reference exposure value from which exposure conditions are varied in an exposure compensation.

Further features of the present invention will become apparent from the following description of exemplary embodiments with reference to the attached drawings.

BRIEF DESCRIPTION OF THE DRAWINGS

FIG. 3 is a flowchart related to processing for setting a reference value of proper exposure in an embodiment.

FIG. 6 is a flowchart related to warning display processing according to an embodiment.

FIG. 7 is a diagram showing examples of a warning display content according to an embodiment.

FIG. 9 is a flowchart related to processing for changing a reference value of proper exposure according to an embodiment.

FIG. 10 is a flowchart related to details of step S906 in FIG. 9.

FIG. 11 is a diagram showing an example of a method for calculating an interpolated reference value according to an embodiment.

FIGS. 12A to 12C are diagrams showing a display example when setting an interpolated reference value in an embodiment.

DESCRIPTION OF THE EMBODIMENTS

Figure 1:
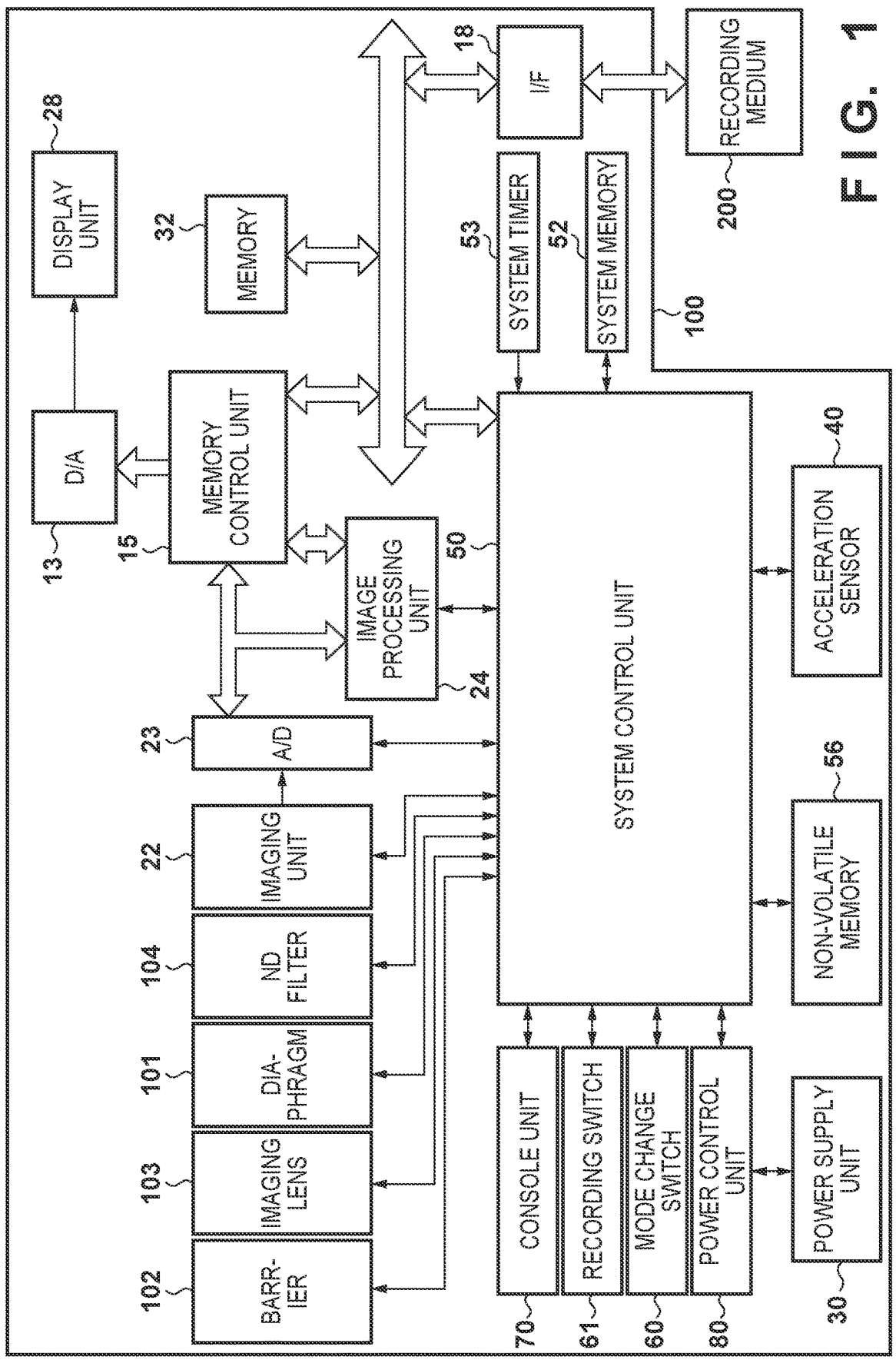
FIG. 1 is a block diagram showing an exemplary function configuration of an image capture apparatus 100 according to an embodiment of the present invention.

Exemplary embodiments of the present invention will now be described in detail in accordance with the accompanying drawings. Note that embodiments will be described below in which the present invention is applied to an image capture apparatus (e.g., a digital camera and digital video camera) that uses an image sensor, but the present invention can be applied to any electronic devices that have an image-capturing function. Note that examples of such electronic devices include smartphones, personal computers, tablet terminals, game machines, and the like in addition to image capture apparatuses, but there is no limitation thereto.

In addition, each of the configurations illustrated in the drawings as functional blocks may be constituted by independent hardware (an ASIC, an ASSP, a discrete circuit, etc.), or a plurality of functional blocks may be constituted by a single item of hardware. In addition, a configuration represented as a functional block may be realized by a programmable processor executing a program.

First Embodiment

FIG. 1 is a block diagram schematically showing an exemplary function configuration of an image capture apparatus 100 according to a first embodiment of the present invention.

An imaging lens 103 is an image-forming optical system constituted by a plurality of lenses, and forms an optical image of a subject on an imaging plane. The imaging lens 103 has a movable lens and a driving mechanism thereof. Examples of the movable lens includes a variable magnification lens, a focus lens, a shift lens, and the like. A movable barrier 102 is provided over the front face of the imaging lens 103. The barrier 102 covers the front face of the imaging lens 103 when the image capture apparatus 100 is turned off, sleeping, or the like, and exposes the front face of the imaging lens 103 in a shooting stand-by state, during photography, and the like.

A diaphragm 101 may also function as a mechanical shutter. An ND filter 104 can be inserted into and removed from a light path, and when inserted into the light path, reduces the light amount.

An imaging unit 22 has an image sensor and a peripheral circuit related to driving of the image sensor. The image sensor may be a CCD/CMOS image sensor in which a plurality of photoelectric conversion portions are arranged two-dimensionally. Examples of the peripheral circuit include a horizontal scanning circuit, a vertical scanning circuit, and the like. A system control unit 50 to be described later can control, through the peripheral circuit, an electric charge accumulation period (electronic shutter speed) of the image sensor, a method for reading out signals from the photoelectric conversion portions (for example, readout with or without addition or thinning), signal gain, and the like. Analog image signals that are read out in units of pixels or photoelectric conversion regions, and have values that are based on the amount of incident light (subject luminance) are output from the imaging unit 22.

An A/D converter 23 converts analog image signals that are output from the imaging unit 22 into digital image signals (image data). The A/D converter 23 outputs digital image signals to an image processing unit 24 or a memory control unit 15.

The image processing unit 24 applies various types of image processing to image data (input data) that is supplied from the A/D converter 23 or the memory control unit 15. The image processing unit 24 outputs an image processing result to the memory control unit 15 or a system control unit 50 in accordance with applied processing. Examples of image processing that is applied by the image processing unit 24 include pixel interpolation (demosaic) processing, resize processing, color conversion processing, gamma correction processing, white balance adjustment processing, processing for adding a digital gain, and the like. In addition, the image processing unit 24 can also generate evaluation values and image signals that are used for automatic exposure control (AE) and automatic focus detection (AF), detect motion vectors, and detect a region (for example, a face region) that has a specific feature. For example, the image processing unit 24 can calculate average luminance of a face region, average luminance of one entire frame, and the like as luminance information of a captured image of one frame. The image processing unit 24 further encodes still image or moving image data to record the image, and decodes encoded still image or moving image data to display the image, for example.

The system control unit 50 realizes functions of the image capture apparatus 100 by controlling operations of constituent elements of the image capture apparatus 100. For example, the system control unit 50 may be one or more programmable processors (e.g., CPUs or MPUs). In this case, the system control unit 50 controls operations of the constituent elements of the image capture apparatus 100 by reading a program stored in a non-volatile memory 56, for example, to a system memory 52, and executing the program.

At least a portion of the non-volatile memory 56 is rewritable. The non-volatile memory 56 stores programs that can be executed by the system control unit 50, constants such as setting values, data for displaying a GUI such as a menu screen, unique information of the image capture apparatus 100, and the like.

The system memory 52 is a memory that is used by the system control unit 50, and is used for temporarily storing programs, variables and constants, and information required for executing a program.

The system control unit 50 also controls display on a display unit 28. Furthermore, the system control unit 50 controls the imaging lens 103, the diaphragm 101, the ND filter 104, the imaging unit 22, and the like using luminance information of a captured image calculated by the image processing unit 24, various evaluation values, and the like, so as to execute AE and AF.

An acceleration sensor 40 that is a gyro sensor, for example, outputs a signal indicating a change in movement and the orientation of the image capture apparatus 100 to the system control unit 50. For example, the system control unit 50 can perform image stabilization according to a signal from the acceleration sensor 40 by changing the position of the shift lens of the imaging lens 103 or a range in which signals are read out from the image sensor of the imaging unit 22.

A memory 32 temporarily stores image data and sound data through the memory control unit 15 and the system control unit 50. For example, the memory 32 is used as a buffer during continuous shooting, and stores image data captured by the imaging unit 22 and converted into digital data by the A/D converter 23, and image data to be displayed on the display unit 28. The memory 32 has a storage capacity sufficient for storing moving image and sound for a predetermined time.

In addition, a portion of the memory 32 is also used as a memory for screen display (video memory). A D/A converter 13 converts, into analog signals, image data that is stored in the memory 32 and is to be displayed, and supplies the analog signals to the display unit 28 that is an LCD or the like. Accordingly, a captured image, a GUI, information regarding the image capture apparatus, and the like are displayed on the display unit 28. The display unit 28 is also used as an electric viewfinder. In this case, the system control unit 50 controls an operation of shooting a moving image using the imaging unit 22, an operation of generating image data for display from a shot moving image and writing the generated image data to the memory 32, and an operation of reading out image data for display from the memory 32, D/A converting the image data, and supplying the image data to the display unit 28.

A system timer 53 generates signals for controlling various timings based on a built-in timepiece or a built-in clock, and supplies the generated signals to the system control unit 50. A mode change switch 60, a recording switch 61, and a console unit 70 constitute an input device group for the user to input an instruction to the image capture apparatus 100. In addition, if the display unit 28 is a touch display, the display unit 28 also functions as an input device for the user to input an instruction to the image capture apparatus 100. Operations of these input devices are detected by the system control unit 50. The system control unit 50 controls constituent elements so as to perform an operation that is based on a detected operation.

For example, the image capture apparatus 100 operates in one of a plurality of operation modes including a moving image recording mode, a still image recording mode, and a playback mode, and an operation mode can be selected (switched) using the mode change switch 60. Note that the moving image recording mode and the still image recording mode may be further subdivided into sub modes such as an automatic shooting mode, an automatic scene determination mode, a manual mode, various scene modes, a program AE mode, and a custom mode. A scene mode is a mode in which setting suitable for shooting is performed by designating one from among representative types of shooting scenes. A configuration may be adopted in which all the modes can be directly selected by operating the mode change switch 60. Alternatively, a configuration may also be adopted in which the moving image recording mode, the still image recording mode, the playback mode are selected using the mode change switch 60, and the sub modes are selected using another console member.

The system control unit 50 switches between a shooting stand-by state and a shooting (recording) state every time the recording switch 61 is operated in the moving image recording mode. Note that a configuration may be adopted in which, if an operation on the recording switch 61 is detected in the still image recording mode or playback mode, the system control unit 50 switches the operation mode to the moving image recording mode so as to start recording a moving image. Note that shooting (recording) of a still image is executed when an operation on a release button included in the console unit 70 is detected. Operations related to shooting and recording a moving image and still image can be performed using a known method, and thus a detailed description thereof is omitted. If an operation on the release button is detected when a moving image is being recorded, the system control unit 50 may execute an operation of recording a still image. The system control unit 50 stores, in data files, still images and moving images acquired through shooting, and records the data files in a recording medium 200.

The console unit 70 may include a menu button, a power switch, a console member for designating a direction (for example, four direction keys or a joystick), a determination (set) button, and the like in addition to the release button. In addition, a combination of GUI parts that are displayed on the display unit 28 and a console member (a touch panel, buttons, etc.) associated therewith also function as an input device that constitutes the console unit 70.

A power control unit 80 comprises a DC-DC converter, a switch circuit for switching a block that is to be energized, and the like. The power control unit 80 detects, as a state of the power supply unit 30, whether or not power is supplied from the outside, whether or not a battery is mounted, the type of the battery, the battery remaining capacity, and the like. In addition, the power control unit 80 controls a voltage that is supplied to constituent elements including the recording medium 200 by controlling the DC-DC converter based on these detection results and an instruction of the system control unit 50. The power supply unit 30 is constituted by a detachable primary battery and secondary battery, an AC adapter, and the like.

A recording medium I/F 18 is an interface to the recording medium 200. The recording medium 200 may be a memory card, a hard disk drive, or the like. The recording medium 200 may be built in or detachable from the image capture apparatus 100. In addition, there may be a plurality of recording mediums 200.

Method for Determining Proper Exposure

Next, a method for determining proper exposure that is used for AE processing and the like, in the image capture apparatus 100, will be described. Proper exposure corresponds to an exposure amount with which a luminance evaluation value of an image within a light metering range matches a predetermined reference value. Therefore, proper exposure for the same shooting scene can differ according to the light metering range, a method for calculating a luminance evaluation value, and the reference value. In addition, proper exposure is represented as a value indicating a reference (0 level) when the user performs exposure compensation. Therefore, when the user performs exposure compensation, it is possible to perform, using a value indicated by proper exposure as the reference (0 level), positive or negative exposure compensation of any step (one step corresponds to 1 Ev) according to exposure in APEX units, for example.

A luminance evaluation value is generated by the image processing unit 24 from data of an image acquired through shooting (before gamma correction processing is applied). The luminance evaluation value can be calculated using data of an image included within the light metering range. In an ordinary image capture apparatus, a light metering range and a method for calculating a luminance evaluation value can be selected from a plurality of options (light metering modes). For example, a configuration can be adopted in which at least one of a representative luminance for an entire image and representative luminances for one or more partial images is obtained, and a final luminance evaluation value is obtained based on one or more representative luminances. In the case of using a plurality of representative luminances, it is possible to increase the weight of the representative luminance of a central portion or a face region of the image. A representative luminance may be an average luminance or an integration value of a luminance, for example. Note that a method for calculating a luminance evaluation value described here is merely exemplary, and a luminance evaluation value may be calculated using another method.

Note that, in the case of calculating a luminance evaluation value from data of an image acquired using an image sensor that has color filters, each pixel has only luminance information corresponding to one of the color components of the color filters. Therefore, a luminance evaluation value may be calculated only from the value of a pixel corresponding to a specific color component.

On the other hand, brightness of an achromatic color subject with reflectance of 18% (a standard reflecting body) is used for a reference value of luminance. Exposure conditions are determined such that the exposure amount is increased if the luminance evaluation value is lower (darker) than a reference value of luminance, and the exposure amount is decreased if the luminance evaluation value is higher (brighter) than the reference value of luminance. In other words, if a luminance evaluation value that is actually acquired is lower than the reference value, the exposure amount is increased, and if the luminance evaluation value is higher than the reference value, the exposure amount is decreased, using, as a reference value, a luminance evaluation value in the case where an image within the light metering range is assumed to be an image acquired by shooting an achromatic color subject with reflectance of 18%. The exposure amount can be increased by opening the diaphragm (reducing the aperture value), increasing the shooting sensitivity, decreasing the shutter speed (extending the electric charge accumulation period), decreasing the density of the ND filter (or withdrawing the ND filter from the light path), or the like. It is sufficient that such control is performed in the opposite directions to decrease the exposure amount.

If the luminance evaluation value appropriately represents the brightness of a subject (main subject) intended by the photographer, proper exposure that is determined by performing such automatic exposure control functions desirably. On the other hand, if the luminance evaluation value does not appropriately represent the brightness of a main subject, proper exposure does not function desirably. For example, in a scene in which the ratio of a main subject in the image is low, and the brightness of the background is largely different from the brightness of the main subject, the main subject is too dark or too bright with proper exposure acquired by performing automatic exposure control. Examples of such a scene include a backlit scene, a scene in which a snow scene or a night sky is used as a background, and the like. In addition, in the case where a main subject is a person, if the color of his or her clothing is bright, underexposure tends to occur, and if the color of the clothing is dark, overexposure tends to occur.

This problem is caused by determining an exposure value based on reflected light of an entire scene including a main subject. Therefore, if exposure is determined based on the amount of incident light of the main subject using an exposure meter of an incident light system that is separate from the image capture apparatus 100, exposure can be determined without being affected by the background of the main subject and the brightness and color of the clothing.

When the illuminance value of illumination light that is illuminating a subject, the aperture value of the image capture apparatus 100, an exposure time, and shooting sensitivity are expressed in APEX (additive system of photographic exposure) units, Expression 1 holds during proper exposure.

$$AV+TV=IV+SV \quad (1)$$

AV is an aperture value (F value), TV is an exposure time (a shutter speed or electric charge accumulation period), IV is an illuminance value, and SV is a value acquired by converting an exposure index (ISO sensitivity, etc.) into APEX units. Note that any parameter related to an amplification factor when amplifying and outputting input data corresponding to light that is incident to the image sensor may be used as an exposure index. Any method can be adopted as this signal amplification method, and examples of the method include adjustment of ISO sensitivity and adjustment of a digital gain during image capturing, change in gamma curve, and the like.

By measuring the amount of incident light (illuminance value) in a portion having the same brightness as a subject region for which proper exposure is desired, and determining a combination of AV, TV, and SV that satisfy Expression 1, it is possible to determine exposure conditions that cause proper exposure.

On the other hand, in the case of determining an exposure value based on reflected light of a subject as with the case of AE of the image capture apparatus 100, when subject luminance, an aperture value of the image capture apparatus 100, an exposure time, and shooting sensitivity are expressed in APEX units, the relationship between their values during proper exposure fulfills Expression 2 below.

$$AV+TV=BV+SV \quad (2)$$

BV is a value acquired by converting subject luminance into APEX units.

Letting the above-described luminance evaluation value be BV, it is possible to determine exposure conditions that cause proper exposure, by determining a combination of AV, TV, and SV so as to satisfy Expression 2.

Gamma Correction

Figure 2A:
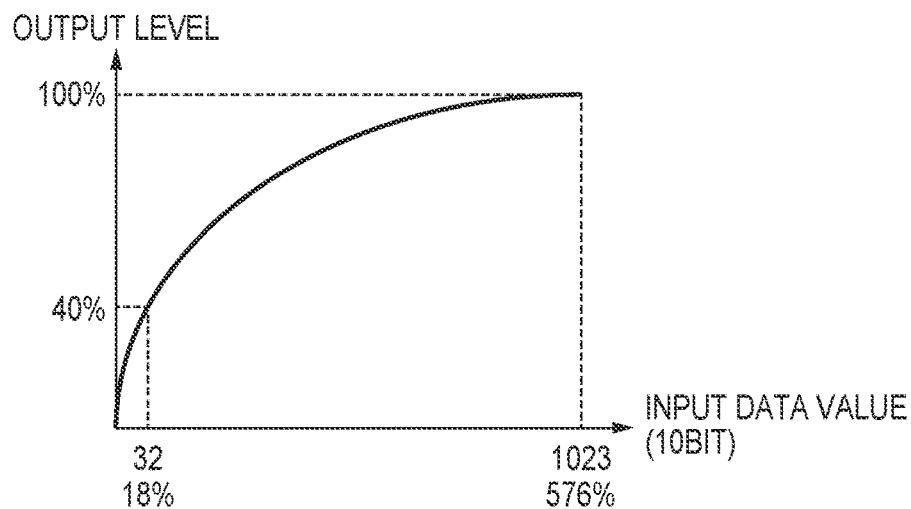
FIGS. 2A to 2C are diagrams showing an example of a gamma curve according to an embodiment.
Figure 2B:
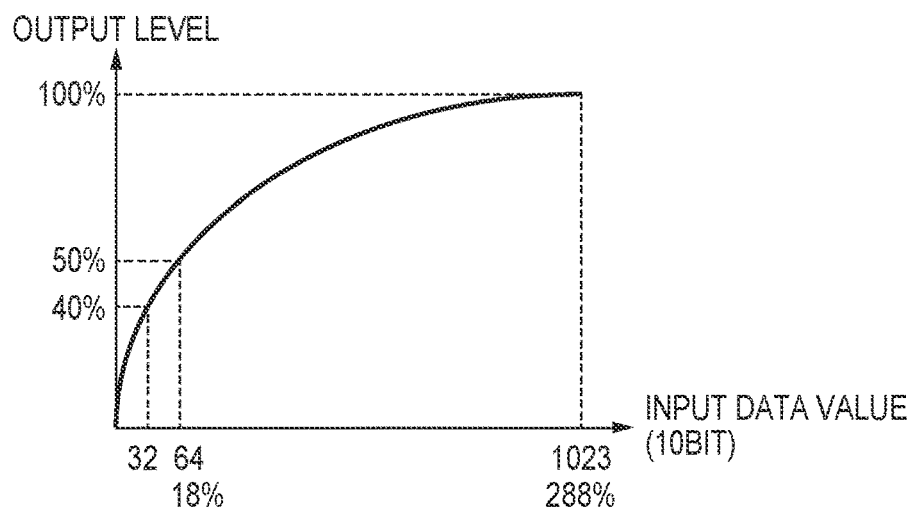
Figure 2C:
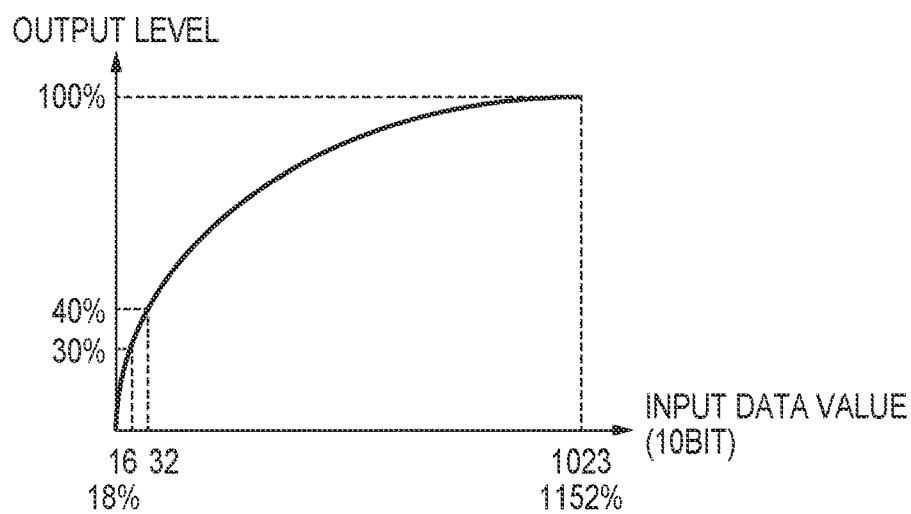

FIGS. 2A to 2C are diagrams showing an example of characteristics of gamma correction (a gamma curve) that is applied to image data (input data) supplied from the A/D converter 23, for example, in the image processing unit 24. Here, the input data is 10-bit data that takes a value corresponding to subject luminance. In addition, examples of a gamma curve for conversion into image signals with an output level (brightness) of 0 to 100% are shown. For example, an output level of 100% is equivalent to a luminance level of 100% white of an image signal. Gamma correction is performed to convert image data, for example, from characteristics of luminance that is output by the image sensor into, for example, gradation characteristics adapted for human visual sense characteristics or gradation characteristics suitable for postproduction. Gamma correction generally has a non-linear conversion characteristic, and a curve representing conversion characteristic is called a gamma curve. It can also be said that gamma correction processing in the image processing unit 24 is gradation conversion processing in which a gamma curve is used.

A luminance reference value that is compared with a luminance evaluation value calculated from image data by the image processing unit 24 is represented as a numerical value suitable for processing in the image processing unit 24, and thus it is difficult for the user to imagine the brightness of the luminance reference value. For example, as shown in FIG. 2A, if the image processing unit 24 handles image data as 10-bit data, and a maximum input value (1023) from the image sensor corresponds to reflectance of 576%, the luminance reference value is an input value of 32 corresponding to the reflectance of 18%.

Therefore, if the luminance evaluation value is 32, the system control unit 50 determines that proper exposure is achieved with the current exposure conditions, and there is no need to change the exposure conditions. On the other hand, if the luminance evaluation value is not 32, the system control unit 50 changes the exposure conditions so as to achieve proper exposure. Note that the luminance reference value varies according to the magnitude of reflectance corresponding to the maximum output value of the image sensor.

In this embodiment, the output level when a subject with reflectance of 18% is shot with proper exposure (the output level that is acquired by converting a luminance reference value based on a gamma curve) is used as the reference value of proper exposure. For example, in the case of using the gamma curve in FIG. 2A, the reference value of proper exposure corresponds to an output level of 40%. By using an output level after gamma correction as a reference value of proper exposure in this manner, the reference value of proper exposure can be handled in a similar manner to a level when video signals are displayed on a waveform monitor, and thus the brightness of the reference value can be easily imagined.

Here, making the subject appear more brightly than during proper exposure is equivalent to converting an input data value corresponding to reflectance of 18% into an output level that is higher than 40%, as shown in FIG. 2B, for example. This can be realized by increasing the reference value of proper exposure.

An operation of changing a reference value of proper exposure will be described with reference to the flowchart in FIG. 3.

In step S301, the system control unit 50 accepts setting of an output level that is used as a reference value of proper exposure. For example, the system control unit 50 causes the display unit 28 to display a screen for setting a reference value, and thus can accept setting of an output level made by the user. In the setting screen, the user can set an output level to have as a reference value by selecting an output level to be used from a plurality of options or directly inputting a numerical value. Note that the options do not need to be numerical values, and may be item names of usages (for example, indoor usage and outdoor usage) or the like that allow the user to easily perform setting. In this case, the system control unit 50 can obtain an output level corresponding to an option by referring to the non-volatile memory 56, for example. Note that a function for adjusting the value of an output level or a function for selecting a specific option may be assigned to an input device included in the console unit 70 instead of providing a setting screen.

When the output level is set in step S301, the system control unit 50 obtains, in step S302, a reference value of luminance based on the output level that has been set and a gamma curve (conversion characteristic). For example, in the case where the gamma curve shown in FIG. 2B is being used, if the output level that is used as proper exposure is set to 50%, the reference value of luminance is 64. The reference value of luminance corresponds to reflectance of 18%, and thus the reflectance to which a maximum value 1023 of input data corresponds is 288% ($\approx 18*1024/64$).

Changing a reference value of luminance from 32 to 64 is equivalent to brightening proper exposure by one step, and can be said to be subtracting 1 from the AV value or the TV value or adding 1 to the BV value in Expression 2, for example. In this case, by subtracting 1 from the SV value, Expression 2 can be fulfilled. In S303, the system control unit 50 subtracts 1 from the SV value by halving an exposure index (ISO sensitivity corresponding to proper exposure) according to a change in the luminance reference value.

Note that, in this state, the aperture value and the shutter speed were not changed before and after changing the reference value of proper exposure. Therefore, Expression 2 is not fulfilled, and changed proper exposure cannot be acquired under the exposure conditions under which proper exposure before being changed is acquired. Here, the proper exposure has been changed to acquire higher brightness than before, and thus if shooting is performed under exposure conditions under which proper exposure before being changed is acquired, the subject appears darker than with the changed proper exposure. In view of this, in the case where the reference value of proper exposure has been changed, the exposure conditions may be changed so as to cancel the change. In the case of this embodiment, by subtracting 1 from the AV value or the TV value, Expression 2 can be satisfied. In other words, it is sufficient that the F value of the diaphragm 101 is decreased by one step, or the shutter speed (or the electric charge accumulation period) is doubled. Accordingly, it is possible to set exposure conditions under which changed proper exposure is acquired.

In this embodiment, a configuration is adopted in which the user can change a reference value of proper exposure. Therefore, for example, if a switch between a reference value for indoor photography and a reference value for outdoor photography is possible, the user can always adjust the exposure amount using, as a reference, an indicator of proper exposure indicated by a built-in exposure meter or an external exposure meter. There is no need to manage the exposure compensation amount that is necessary when the reference value of proper exposure is fixed, and it is possible to prevent a shooting failure due to an error of the exposure compensation amount.

In addition, the setting of the reference value of proper exposure can be performed at an output level after gamma correction, and thus it is easy to imagine the brightness of the subject when shooting is performed with proper exposure, and it is possible to easily set a reference value of proper exposure for realizing the brightness of the subject intended by the user.

A configuration is also adopted in which exposure conditions are changed in accordance with a change in the reference value of proper exposure. Therefore, even after the reference value of proper exposure is changed, Expressions 1 and 2 hold true. Accordingly, it is easy to understand exposure conditions under which proper exposure is achieved using the external exposure meter, and to perform setting of exposure conditions in reference with the reference value of proper exposure displayed on the display unit 28 of the image capture apparatus 100. Furthermore, the reference value of proper exposure can be changed, and thus exposure compensation of any step in which this reference value is used as 0 level is possible, and exposure conditions can be set more accurately for brightness intended by the user.

For example, in the case of shooting a moving image that is based on a high dynamic range (HDR) stipulated in ITU-R Recommendation BT. 2100, image capturing with brightness that is appropriate to the scene is preferred, for example, capturing an image of a subject more darkly in indoor photography and more brightly in outdoor photography. In this embodiment, it is possible to easily change the reference value of proper exposure in each of indoor photography and outdoor photography, and thus in the case of outdoor photography, it is possible to easily shoot a brighter moving image than in indoor photography, while using automatic exposure control.

Note that the gamma curves, the number of bits of the input data value, and the like that have been used in this embodiment for description are merely exemplary, and the present invention is not limited thereto.

Second Embodiment

Next, a second embodiment of the present invention will be described. In the first embodiment, a configuration has been described in which a reference value of proper exposure is changed by designating an output level. In this embodiment, a configuration will be described in which a reference value of proper exposure is changed by designating a dynamic range. The configuration of an image capture apparatus and determination on proper exposure based on Expressions 1 and 2 are similar to those in the first embodiment. Here, a dynamic range indicates a degree of brightness of a subject that can be expressed with respect to a reference value of luminance corresponding to proper exposure. Specifically, the dynamic range can be represented as reflectance (X %) corresponding to the maximum input value (1023 in the case of 10-bit input) when a reference value of luminance corresponding to proper exposure is set to reflectance of 18%. Alternatively, the dynamic range can also be represented as the number of steps in APEX units as follows: dynamic range [APEX]=$\log_2$(X %/18%).

With the reference value of proper exposure shown in FIG. 2A, the dynamic range (reflectance) is 576%. This indicates that it is possible to represent a subject whose brightness is up to five steps (=$\log_2$(576/18)) over from proper exposure (reflectance 18%). However, there are cases where it is desired to further expand the dynamic range such as a case of shooting a bright sky or a light source.

In view of this, in this embodiment, it is made possible to set a reference value of proper exposure based on a magnitude of a dynamic range. For example, the system control unit 50 displays, on the display unit 28, a screen that allows a magnitude of a dynamic range to be set, as a reference value setting screen, and thereby can accept setting performed by the user. In the setting screen, the user can set a dynamic range by selecting a dynamic range that the user desires to realize from a plurality of options, or directly inputting a numerical value (for example, reflectance or a number of steps). Note that the options do not need to be numerical values, and may be item names of usages (for example, indoor usage and outdoor usage), types of a subject (for example, a blue sky and a snow scene), widening the dynamic range to be wider than the standard and narrowing the dynamic range to be narrower than the standard, or the like, that allow the user to easily perform setting. Note that a function for adjusting a value of a dynamic range or a function for selecting a specific option may be assigned to an input device included in the console unit 70, instead of providing the setting screen. In this case, the system control unit 50 can obtain a dynamic range corresponding to an option by referring to the non-volatile memory 56, for example. A dynamic range itself is not a reference value of proper exposure, but the reference value of luminance for proper exposure changes by changing the dynamic range, and thus setting of a dynamic range is substantially equal to setting a reference value of luminance for proper exposure.

As shown in FIG. 2C, when the dynamic range is widened by one step to have six steps (the maximum reflectance of 1152%), a reference value of luminance (reflectance of 18%) equivalent to proper exposure is 1024*18/1152≈16. In this manner, in step S302, the system control unit 50 calculates a reference value of luminance based on the dynamic range that has been set in step S301. Accordingly, an output level corresponding to the reference value of luminance changes from 40% to 30%.

Contrary to the first embodiment, changing the reference value of luminance from 32 to 16 is equivalent to darkening the proper exposure amount by one step (adding 1 to the AV value or the TV value). In order to fulfil Expression 2 for a changed proper exposure amount, the system control unit 50 doubles the exposure index (ISO sensitivity corresponding to proper exposure) so as to add 1 to the SV value, according to the change in the luminance reference value.

Also in this embodiment, exposure conditions can be changed in order to acquire a changed proper exposure amount. For example, in the case where exposure conditions under which a proper exposure amount before being changed is acquired are set, the system control unit 50 adds 1 to the AV value or the TV value so as to cancel the change in the reference value of proper exposure. In other words, by increasing the F value of the diaphragm 101 by one step, or halving the shutter speed (or the electric charge accumulation period), it is possible to set exposure conditions under which changed proper exposure is acquired.

In this embodiment, a configuration is adopted in which the user can change the reference value of proper exposure by setting a dynamic range. Therefore, for example, if a switch between a dynamic range for indoor photography and a dynamic range for outdoor photography is possible, the user can always adjust an exposure amount using, as a reference, an indicator of proper exposure indicated by a built-in exposure meter or an external exposure meter. There is no need to manage the exposure compensation amount that is necessary when the reference value of proper exposure is fixed, and it is possible to prevent a shooting failure due to an error of the exposure compensation amount.

In addition, by setting a dynamic range, a change is made to an appropriate reference value of proper exposure, and thus it is possible to easily set an appropriate reference value of proper exposure corresponding to a subject maximum luminance desired by the user.

In addition, exposure conditions are changed according to a change in the reference value of proper exposure. Therefore, even after the reference value of proper exposure is changed, Expressions 1 and 2 hold true. Accordingly, it is easy to understand exposure conditions under which proper exposure is acquired using an external exposure meter, and to set exposure conditions in reference with a reference value of proper exposure that is displayed on the display unit 28 of the image capture apparatus 100.

Note that the gamma curves, the number of bits of the input data value, and the like that have been used in this embodiment for description are merely exemplary, and the present invention is not limited thereto.

Third Embodiment

Next, a third embodiment of the present invention will be described. For example, there are cases where a more realistic image can be shot if shooting is performed such that an image shot outdoor is brighter than an image shot indoor. For example, when a reference value of proper exposure is set to an output level of 40% regarding indoor photography and 50% regarding outdoor photograph and shooting is performed with proper exposure for each of indoor photography and outdoor photograph, it is possible to perform shooting such that an image shot outdoor is brighter than an image shot indoor.

Comparing FIG. 2A in which the reference value of proper exposure corresponds to an output level of 40% with FIG. 2B in which the reference value of proper exposure corresponds to an output level of 50%, a dynamic range for indoor photography corresponds to reflectance of 576% while a dynamic range of outdoor photography decreased to reflectance of 288%. Accordingly, usually, in outdoor photography in which subject luminance is higher than in indoor photography, blown-out highlight is more likely to occur than in indoor photography.

Figure 4A:
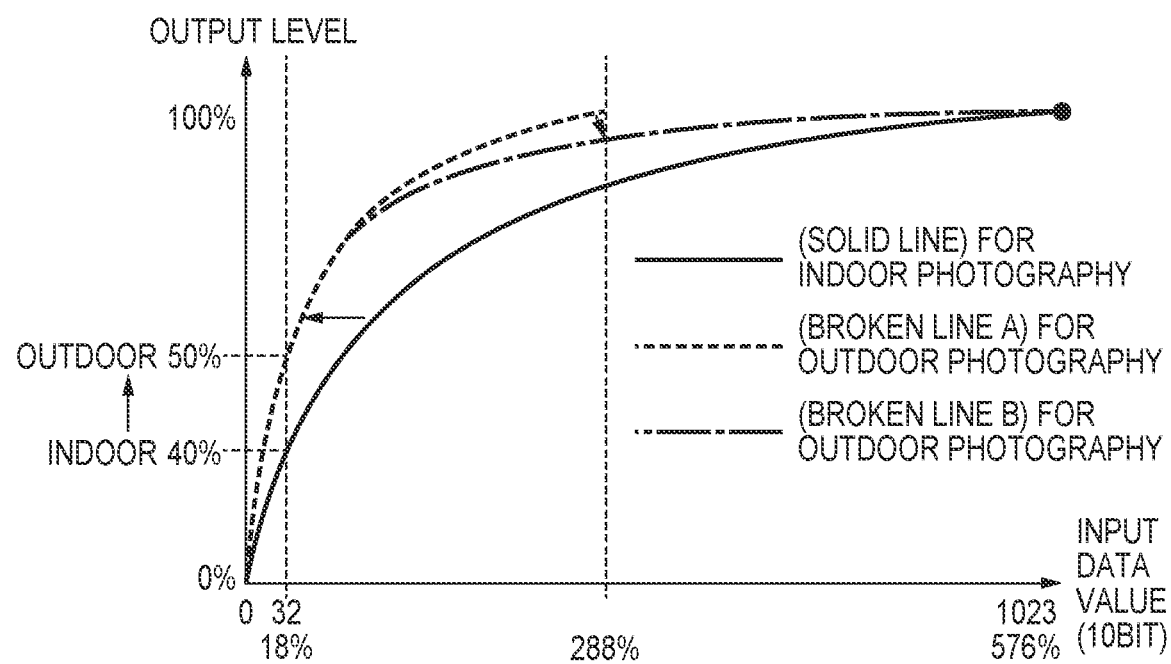
FIGS. 4A and 4B are diagrams related to details of a gamma curve according to an embodiment.
Figure 4B:
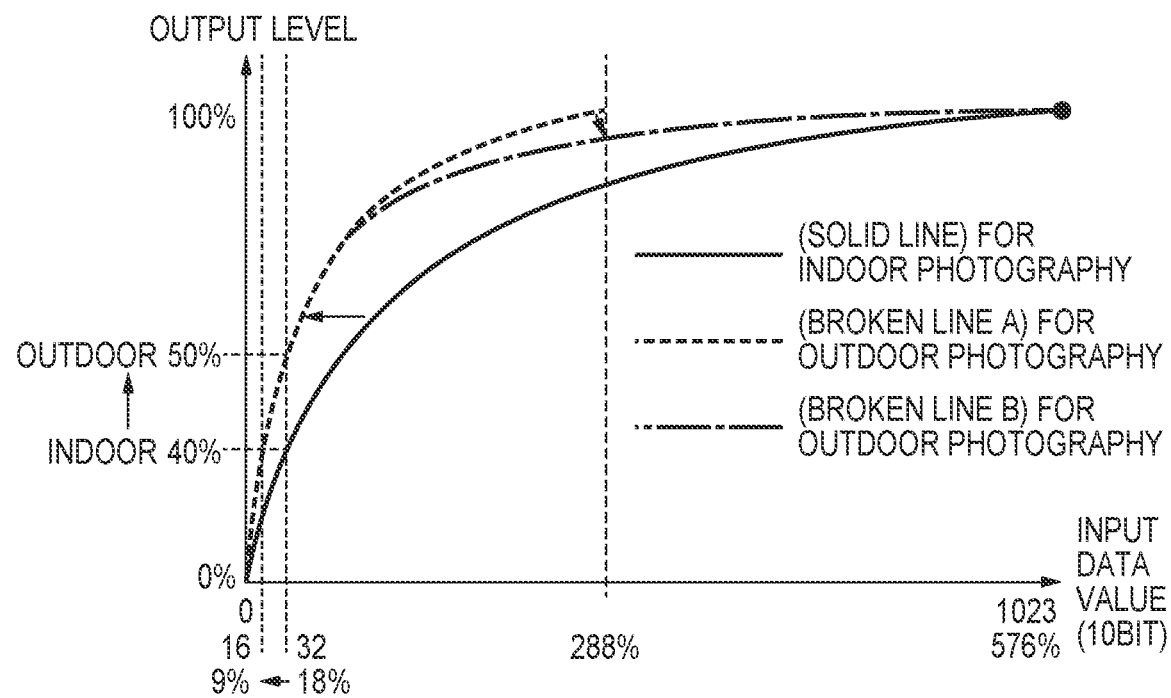

In this embodiment, since conversion characteristics (gamma curve) acquired through gamma correction differs according to a reference value of proper exposure, and thereby such an issue is solved. FIGS. 4A and 4B are diagrams showing an example of a gamma curve used in this embodiment. In this embodiment, the image processing unit 24 selectively uses one of a plurality of gamma curves for converting input data equivalent to a reference value of luminance for proper exposure into a different output level. Specifically, one of a gamma curve for indoor photography for converting input data corresponding to a reference value of luminance for proper exposure into an output level of 40% and a gamma curve for outdoor photography for converting such input data into an output level of 50% is selectively used.

In the case where the image processing unit 24 uses the gamma curve for indoor photography, the system control unit 50 determines exposure conditions based on the luminance evaluation value such that the average brightness of the subject corresponds to an output level of 40%. In the case where input data is 10 bits, the reference value of luminance for proper exposure (reflectance of 18%) is 32.

On the other hand, in the case where the image processing unit 24 uses the gamma curve for outdoor photography, the system control unit 50 determines exposure conditions based on the luminance evaluation value such that the average brightness of the subject corresponds to an output level of 50%. The gamma curve for outdoor photography of this embodiment has characteristics indicated by a broken line A according to which the reference value of luminance for proper exposure (reflectance of 18%) matches the gamma curve for indoor photography. By maintaining the reference value of luminance for proper exposure, it is possible to acquire an effect that makes it appear that exposure has been changed, without changing contrast in the image. For example, by using, as the gamma curve for outdoor photography, characteristics in which the gamma curve for indoor photography is compressed to a range of a dynamic range of reflectance of 288%, and that is indicated by a broken line A, it is possible to maintain the reference value of luminance for proper exposure. However, if all the characteristics indicated by the broken line A are used, the dynamic range is compressed to reflectance of 288%, and thus, in a section from a point (knee point) in reflectance from 18 to 288% to reflectance of 576%, a switch is made to characteristics indicated by a broken line B. Also in outdoor photography, it is possible to realize a dynamic range similar to that for indoor photography by covering, with the characteristics indicated by the broken line B, up to the maximum reflectance same as that in the gamma curve for indoor photography.

Note that the output level during proper exposure varies due to a switch from the gamma curve for indoor photography to the gamma curve for outdoor photography, but the reference value of luminance for proper exposure and the dynamic range do not vary. Therefore, exposure conditions that are determined by the system control unit 50 through automatic exposure control do not depend on the gamma curve that is used. In other words, even if the gamma curve that is used varies, the exposure index of the image capture apparatus 100 does not vary.

Whether to use the gamma curve for indoor photography or the gamma curve for outdoor photography can be manually set (switched) by the user operating on the menu screen or a specific input device of the console unit 70. Alternatively, the gamma curve that is used may be automatically set by the system control unit 50 according to the average luminance of the captured image and change in the maximum luminance value.

According to this embodiment, it is possible to selectively use a plurality of gamma curves in which the reference value of luminance for proper exposure and the dynamic range of luminance are the same, and the output level for the reference value of luminance is different. Therefore, through automatic exposure control that does not depend on a gamma curve that is used, without changing the exposure index of the image capture apparatus, it is possible to perform shooting in which brightness of the image is different.

Here, for ease of describing and understanding, a case has been described in which two gamma curves are prepared. However, three or more gamma curves can also be prepared. Note that the gamma curves, the number of bits of the input data value, and the like that have been used in this embodiment for description are merely exemplary, and the present invention is not limited thereto.

Fourth Embodiment

Next, a fourth embodiment of the present invention will be described. In the third embodiment, a case has been described in which the system control unit 50 of the image capture apparatus 100 determines exposure conditions through automatic exposure control. Therefore, for example, when the system control unit 50 automatically switches between a gamma curve for outdoor photography and a gamma curve for indoor photography, the brightness of the image varies. In this embodiment, a case will be described in which exposure conditions are manually set. In this case, exposure conditions are fixed to values that have been set by the user, and do not vary unless the user changes the values. Therefore, it is required to keep the brightness of the image from varying as much as possible if the gamma curve is changed.

Here, exposure conditions that are manually set include indoor exposure setting and outdoor exposure setting in addition to the above-described Av value, Tv value, and Sv value. In the indoor exposure setting, an output level corresponding to the reference value of luminance for proper exposure is 40%, and, in the outdoor exposure setting, an output level corresponding to the reference value of luminance for proper exposure is 50%.

In the case of performing shooting under proper exposure with the indoor exposure setting, the user determines a combination of the Av value, the Tv value, and the Sv value such that the output level is 40%.

Assume that the user makes change to the outdoor exposure setting in this state. The system control unit 50 makes change from the gamma curve for indoor photography shown in FIG. 4A to the gamma curve for outdoor photography according to this change. When the gamma curve is changed, unless the combination of the Av value, the Tv value, and the Sv value is changed, the output level of the image changes to 50% as described in the third embodiment. This appears to be an unintended exposure change to the user.

Therefore, the system control unit 50 performs control so as to make exposure conditions that have been manually set appear to be maintained at the time of changing the gamma curve. Specifically, the system control unit 50 changes the input data value so as to keep the brightness of the image from differing from the brightness before the gamma curve was changed, as much as possible. In the example of FIG. 4B, the input data value corresponding to the output level of 40% in the gamma curve for outdoor photography is 16. Therefore, in the case of using the gamma curve for outdoor photography, the system control unit 50, which functions as control unit, decreases the SV value by changing the exposure index (ISO sensitivity corresponding to proper exposure), for example, and decreases the input data value corresponding to the reference value of luminance for proper exposure from 32 to 16. Accordingly, even in the case of switching to and using, during shooting, a gamma curve in which the output level for the input data value differs, the brightness of a shot image can be maintained. Therefore, even if the gamma curve that is used is changed during shooting under exposure conditions that have been manually set, it is possible to suppress influence on the brightness of an image that is shot.

Note that, in this embodiment, shooting in which the gamma curve for outdoor photography is used is in a state where the exposure amount is lower than the proper exposure (underexposure). Therefore, similar to the first embodiment, the exposure index (ISO sensitivity) of the image capture apparatus decreases.

Note that the gamma curves, the number of bits of the input data value, and the like that are used in this embodiment for description are merely exemplary, and the present invention is not limited thereto.

Figure 5:
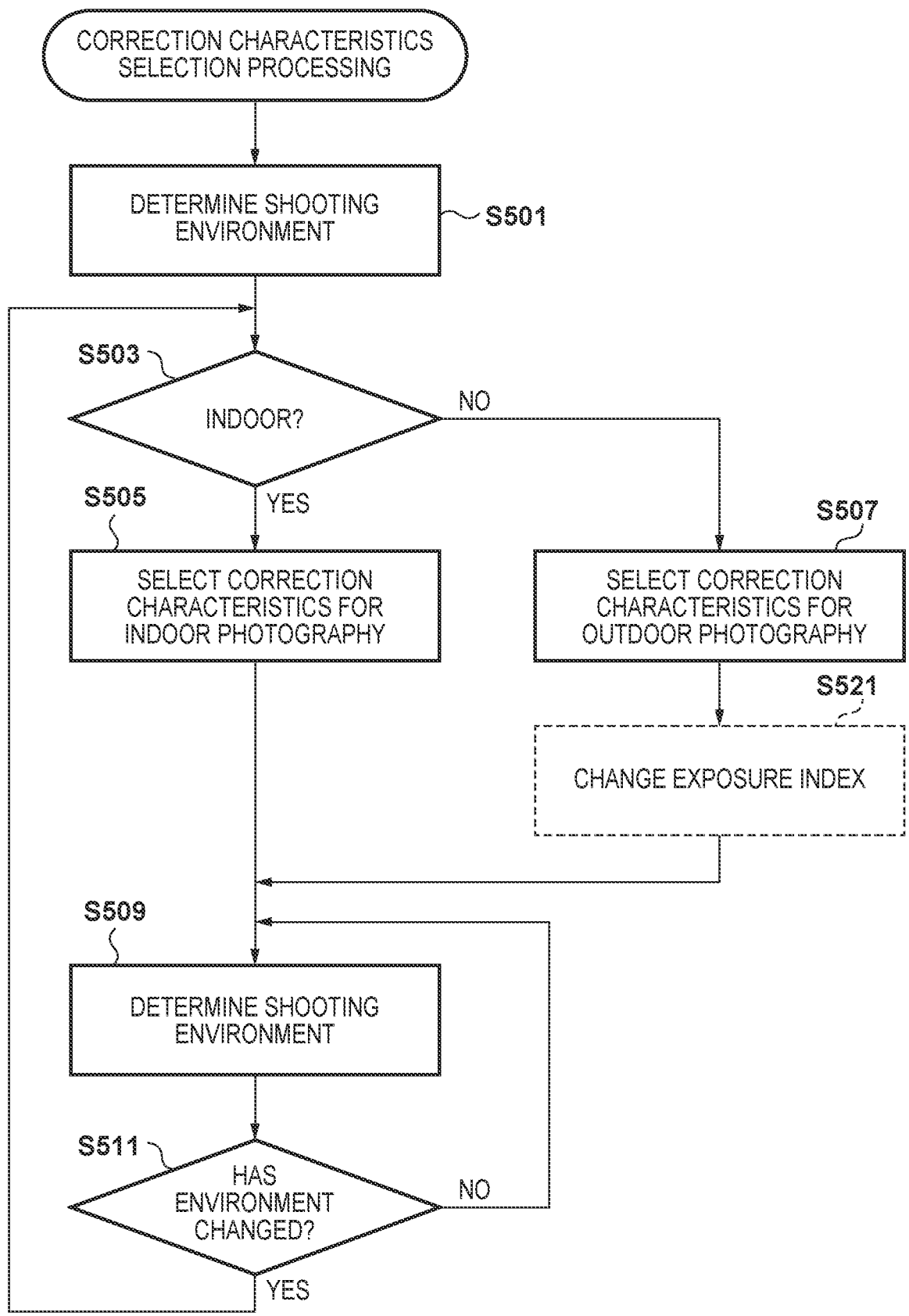
FIG. 5 is a flowchart related to processing for selecting a gamma curve according to an embodiment.

FIG. 5 is a flowchart related to an operation of selecting correction characteristics in the third and fourth embodiments. In step S501, the system control unit 50 determines whether the shooting environment is indoor or outdoor. The determination method is not limited, but, for example, if luminance information that is acquired from a shot image (for example, average luminance or maximum luminance) exceeds a predetermined threshold value, it can be determined that the shooting environment is outdoor. Alternatively, in the case where the user has explicitly set outdoor photography or indoor photography, it is possible to determine the shooting environment based on the setting value.

In step S503, if it is determined that the shooting environment is indoor, the system control unit 50 advances the procedure to step S505, and if it is not determined that the shooting environment is indoor (or if it is determined that the shooting environment is outdoor), advances the procedure to step S507.

In step S505, the system control unit 50 performs setting in the image processing unit 24 so as to use correction characteristics (a gamma curve) for indoor photography, and advances the procedure to step S509. For example, the system control unit 50 may supply data indicating the correction characteristics for indoor photography from the non-volatile memory 56 to the image processing unit 24, or may notify the image processing unit 24 of identification information of the correction characteristics to be used.

In step S507, the system control unit 50 performs setting in the image processing unit 24 so as to use the correction characteristics (gamma curve) for outdoor photography. In the case where exposure conditions are automatically set (the third embodiment), the system control unit 50 advances the procedure to step S509, and if exposure conditions are manually set (the fourth embodiment), advances the procedure to step S521.

In step S521, the system control unit 50 changes the exposure index so as to keep the brightness of the image from differing from the image before change of the correction characteristics, and advances the procedure to step S509.

In step S509, the system control unit 50 determines the shooting environment similarly to step S501, and advances the procedure to step S511.

In step S511, the system control unit 50 determines whether or not the shooting environment has changed, and if it is determined that the shooting environment has changed, returns the procedure to step S503, and if it is not determined that the shooting environment has changed (or if it is determined that the shooting environment has not changed), returns the procedure to step S509. For example, in the case where the shooting environment corresponding to the correction characteristics that is currently used and the shooting environment determined in step S509 are different, the system control unit 50 can determine that the shooting environment has changed.

Fifth Embodiment

Next, a fifth embodiment of the present invention will be described. In the first and second embodiments, a configuration has been suggested in which a reference value of proper exposure (a luminance value or an output level) can be changed by setting an output level or a dynamic range. In addition, in the third and fourth embodiments, gamma curves and operations for automatic exposure setting and manual exposure setting that do not allow change of the reference value of proper exposure (luminance value and output level) to affect the dynamic range have been suggested.

The above-described change in the reference value of proper exposure (luminance value or output level) and change in the gamma curve affect the image quality of an image acquired through shooting. In particular, there are cases where change in a gamma curve in the third and fourth embodiments causes change in the image quality that is difficult to identify through a display device. Therefore, the image capture apparatus according to this embodiment has a function for notifying the user in the case where the reference value of proper exposure (luminance value or output level) has been changed or the gamma curve that is used has been changed. This function is realized by the system control unit 50 operating as a notification unit.

This embodiment can be realized using the image capture apparatus 100 shown in FIG. 1, and thus a description will be given using the configuration of the image capture apparatus 100. In addition, hereinafter, a state where the inclination of a high luminance portion of the gamma curve indicated by the broken line A in each of FIGS. 4A and 4B is made gradual as the gamma curve indicated by the broken line B is referred to as knee being enabled. In addition, the switching position between the gamma curve indicated by the broken line A and the gamma curve indicated by the broken line B is referred to as a knee point. In addition, the increase rate of the gamma curve relative to the input value after the knee point for changing the inclination of the gamma curve after the knee point of the broken line B is referred to as a knee slope.

For example, when an operation of calling a knee setting screen is detected, the system control unit 50 displays, on the display unit 28, the knee setting screen using data stored in the non-volatile memory 56, for example. In the knee setting screen, it is possible to set whether knee is enabled or disabled. Note that a configuration may be adopted in which other items such as the knee point and the inclination of the knee slope can be set. In addition, the reference value of proper exposure can be set with respect to the output level as described in the first embodiment.

The system control unit 50 stores the current reference value for proper exposure in the memory 32, for example, and manages the stored current reference value. When an operation of changing (not determining) the reference value of proper exposure is detected on the screen for setting a reference value of proper exposure, the system control unit 50 compares the detected reference value with the current reference value stored in the memory 32. Note that in the case where the unit for designating the reference value in the setting screen and the unit of the reference value stored in the memory 32 are different, the system control unit 50 converts the value in one unit into a value in the other unit, and then performs the comparison. For example, in the setting screen, an output level (%) is set as a reference value, and a luminance value is stored as a reference value in the memory 32. In this case, the system control unit 50 converts the output level into a luminance value using a gamma curve, and then compares the luminance value with the value stored in the memory 32.

The system control unit 50 determines whether the reference value has been increased or decreased on the setting screen, based on the current reference value and the changed reference value in the setting screen. The system control unit 50 then stores the determination result as information regarding a change direction of the reference value in the memory 32. Note that, if the reference value has not been changed (or if the reference values before and after the change are the same), the system control unit 50 stores, in the memory 32, information indicating that the reference value has not been changed, as information regarding the change direction of the reference value. Subsequently, the system control unit 50 notifies (warns) the user of information regarding the image quality change that is envisioned in the case where the reference value that has been changed on the setting screen is set.

FIG. 6 is a flowchart related to an operation when a reference value of proper exposure is changed in the setting screen, in the image capture apparatus 100 according to this embodiment.

In step S601, the system control unit 50 refers to, for example, information regarding a change direction of a reference of proper exposure stored in the memory 32, and determines whether or not the reference value of proper exposure has been changed to be higher in the setting screen. If it is determined that the reference value has been changed to be higher, the system control unit 50 advances the procedure to step S602, and if it is not determined that the reference value has been changed to be higher (alternatively, it is determined that the reference value has been changed to be lower, or if it is determined that the reference value has not been changed), advances the procedure to step S605.

In step S602, the system control unit 50 refers to the memory 32, and determines whether or not knee is enabled. If it is determined that knee is set to be enabled, the system control unit 50 advances the procedure to step S603, and if it is not determined that knee is set to be enabled (or, if it is determined that knee is set to be disabled), advances the procedure to step S604.

In step S603, the system control unit 50 (notification unit) notifies (warn) the user of change in gradation characteristics in a high luminance portion as image quality change that is envisioned when the reference value is changed to a higher value in the state where knee is enabled, for example. For example, the system control unit 50 can perform a warning regarding image quality change by displaying a message window related to a warning content on the display unit 28, or displaying an icon indicating a warning content. Note that the system control unit 50 can perform the warning using any known method. Display of the warning can be erased immediately or after a certain period elapsed, according to determination that the reference value of proper exposure has not been changed (for example, in the case where setting has been canceled, or the value has been returned to the value before being changed).

In step S604, the system control unit 50 notifies (warns) the user of a decrease in the dynamic range as image quality change that is envisioned when the reference value has been changed to a higher value in the state where the knee is disabled, for example.

In step S605, the system control unit 50 determines whether or not the reference value of proper exposure has been changed to be lower in the setting screen. If it is determined that the reference value has been changed to be lower, the system control unit 50 advances the procedure to step S606, and if it is not determined that the reference value has been changed to be lower (or, if it is determined that the reference value has not been changed), advances the procedure to step S609.

In step S606, the system control unit 50 refers to the memory 32, and determines whether or not knee is enabled. If it is determined that knee is set to be enabled, the system control unit 50 advances the procedure to step S607, and, if it is not determined that knee is set to be enabled (or if it is determined that knee is set to be disabled), advances the procedure to step S608.

In step S607, for example, the system control unit 50 notifies (warns) the user that there is a possibility that the gradation characteristics in a low luminance portion (dark portion) will degrade, as image quality change that is envisioned when the reference value has been changed to a lower value in the state where knee is enabled.

In step S608, for example, the system control unit 50 notifies (warns) the user of degradation in the gradation characteristics in the low luminance portion (dark portion), as image quality change that is envisioned when reference the value has been changed to a lower value in the state where knee is disabled.

In step S609, the system control unit 50 does not perform a particular warning.

Note that processing shown in the flowchart in FIG. 6 is executed every time an operation of changing the reference value is detected in the setting screen. After that, when an instruction to cancel the setting is detected, the system control unit 50 closes the setting screen without changing the reference value. On the other hand, when a determination instruction is detected, the system control unit 50 updates the reference value stored in the memory 32 to the changed value. Accordingly, the change in the reference value is validated. In addition, the system control unit 50 updates information regarding the change direction of the reference value stored in the memory 32 so as to indicate that the reference value has not been changed.

Note that the change direction of the reference value of proper exposure may be determined using another method. For example, during shooting of a moving image, it is possible to compare the current reference value with the reference value used for the immediately preceding frame. In addition, a configuration may be adopted in which reference values before and after change are stored in the memory 32, the reference values are compared, and a change direction of the reference value is determined.

FIG. 7 collectively shows warning contents for respective combinations of knee being enabled/disabled and the change direction of the reference value that have been described above. Here, the warning contents will be described with reference to FIGS. 8A to 8B.

Figure 8A:
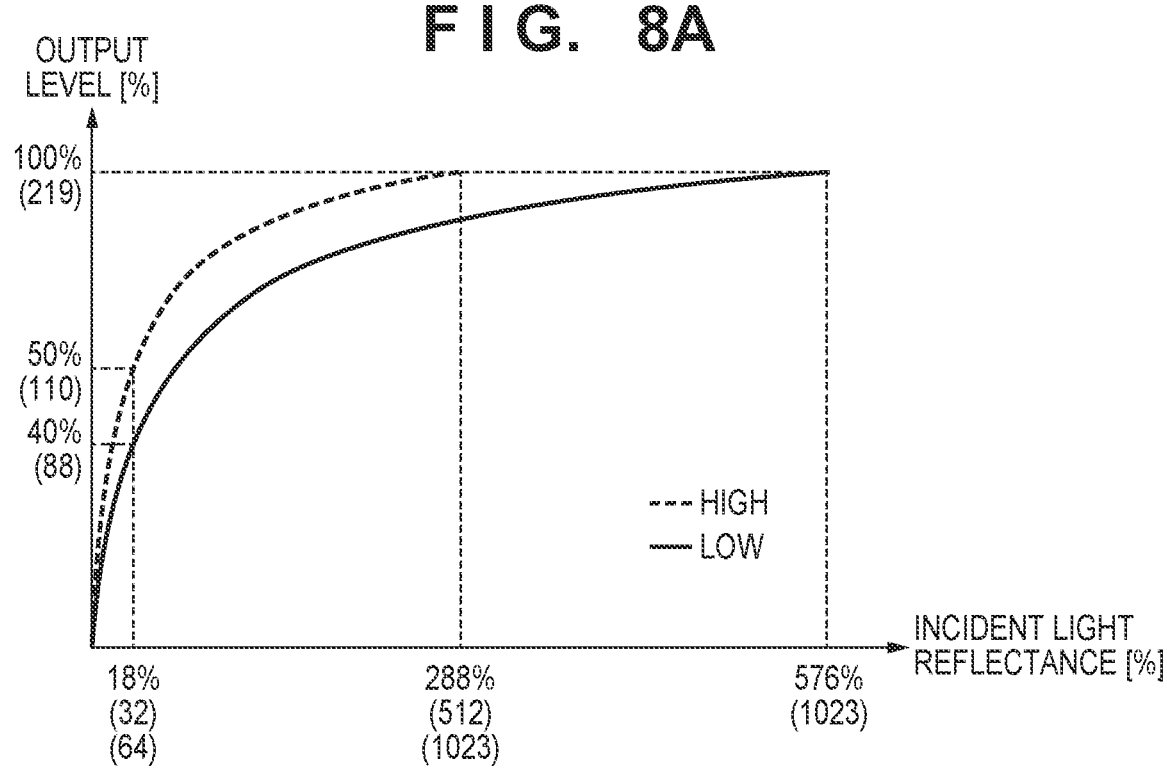
FIGS. 8A and 8B are diagrams for illustrating the purpose of a warning content according to an embodiment.
Figure 8B:
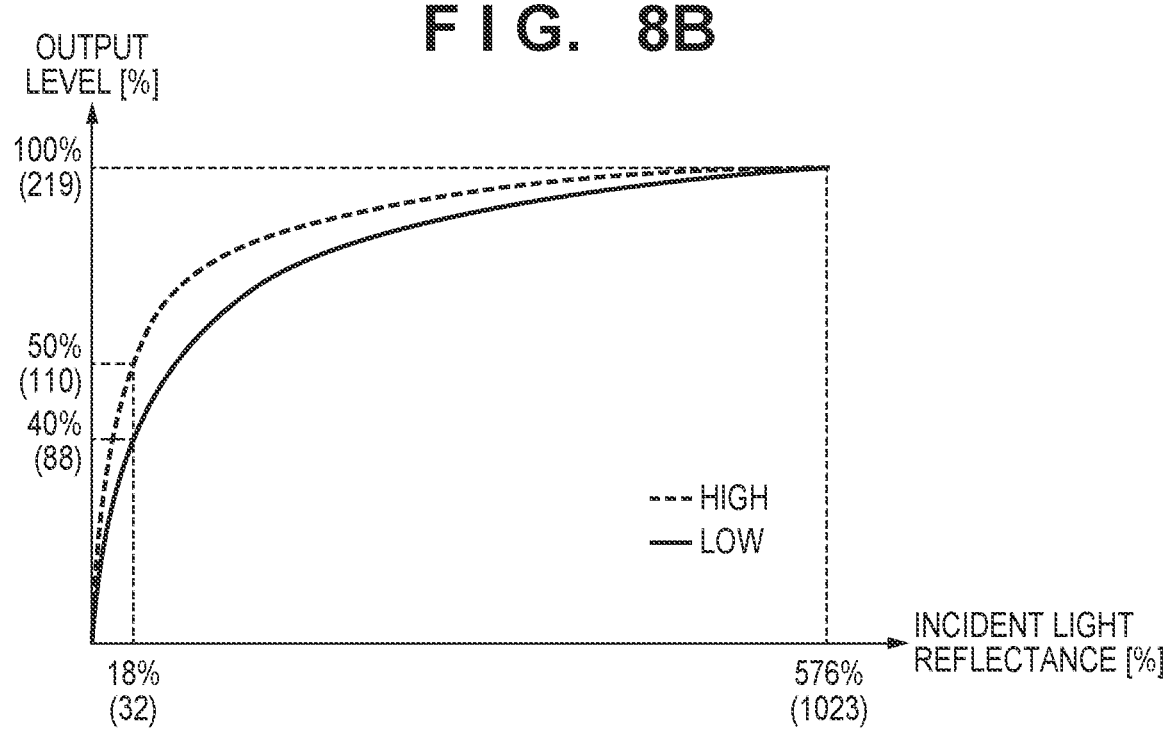

FIGS. 8A and 8B show examples of gamma curves when the reference value of proper exposure is high (output level of 50%) and low (output level of 40%), and here, the horizontal axis indicates reflectance of incident light. FIG. 8A shows a case where knee is disabled, and FIG. 8B shows a case where knee is enabled.

In this embodiment, an input data value is assigned such that the maximum value (=1023) of 10-bit input data represents a saturation signal of the image sensor. Therefore, in the case where reflectance corresponding to the saturation signal differs according to a reference value of proper exposure, correspondence between reflectance and an input data value differs similarly. In the example in FIG. 8A, when the reference value of proper exposure corresponds to an output level of 40%, the maximum value (=1023) of input data corresponds to reflectance of 576%. When the reference value of proper exposure corresponds to an output level of 50%, the maximum value (=1023) of input data corresponds to reflectance of 288%.

As a result, if knee is disabled, when the reference value of proper exposure corresponds to an output level of 50%, the input data value that is assigned to a dark portion (a reflectance of 18% or less) is 64, while, when the reference value of proper exposure corresponds to an output level of 40%, the input data value is halved to 32. Also, when the reference value of proper exposure corresponds to an output level of 50%, the number of output levels is 110, while, when the reference value of proper exposure corresponds to an output level of 40%, the input data value is decreased to 88. Therefore, in the case of changing the reference value of proper exposure to a lower value when knee is disabled, a warning that the gradation characteristics in the dark portion will degrade is performed.

In addition, in the case where knee is disabled, comparing with the case where the reference value of proper exposure corresponds to an output level of 40%, when the reference value of proper exposure corresponds to an output level of 50%, the maximum reflectance (dynamic range) covered by the input data value decreases from 576% to 288%. Therefore, when changing the reference value of proper exposure to a higher value in the case where knee is disabled, a warning that the dynamic range will decrease is performed.

On the other hand, in the present invention, in the case where knee is enabled, a gamma curve that corresponds to the same reflectance (18%) even if a different output level is set as a reference value of proper exposure is used, as illustrated in FIG. 8B. Therefore, an input data value that is assigned to a dark portion is 32 despite the reference value of proper exposure. However, the number of output levels for the dark portion is 110 when the reference value of proper exposure corresponds to an output level of 50%, while the number of output levels for the dark portion decreases to 88 when the reference value of proper exposure corresponds to an output level of 40%. If all the input data values 0 to 32 are converted into values of different output levels, the gradation characteristics in the dark portion does not degrade. However, the gradation characteristics in the dark portion degrades if there are input data values that are converted into values of the same output level, from among the input data values 0 to 32.

Although depending on the characteristics of the gamma curve and dynamic range, the smaller the number of output levels for input data values (0 to 32) of a dark portion is, the higher the possibility that input data values that are converted into values of the same output level are present is. Therefore, in this embodiment, when changing the reference value of proper exposure to a lower value in the case where knee is enabled, a warning that there is a possibility that the gradation characteristics in the dark portion will decrease is performed. Note that a range of a reference value of proper exposure according to which the gradation characteristics in the dark portion decrease may be stored in the non-volatile memory 56 in advance for each combination of gamma curve and dynamic range. In this case, the system control unit 50 may perform a warning according to confirmation that a changed reference value is included in a range of reference value according to which the number of gradations decreases, regarding a combination of a gamma curve and a dynamic range that are used when the reference value is changed. In this case, the system control unit 50 warns that the gradation characteristics will degrade, not that there is a possibility that the gradation will decrease. On the other hand, the system control unit 50 does not perform a warning in the case where a changed reference value is not included in the range of the reference value according to which the number of gradations decreases, regarding a combination of a gamma curve and a dynamic range that are used when the reference value is changed.

In the case where knee is enabled, the dynamic range does not depend on the reference value of proper exposure. However, the gradation of a high luminance portion after the knee point is compressed, and thus the gradation characteristics in the high luminance portion degrades. Therefore, when changing the reference value of proper exposure to a higher value in the case where knee is enabled, warning that the gradation characteristics in the high luminance portion will degrade is performed.

In this embodiment, the user is notified of the influence on the image quality that is envisioned in the case where the reference value of proper exposure is changed, in consideration of the gamma curve and the dynamic range. Therefore, the user can change the reference value after recognizing the influence of a change in the reference value on the image quality.

Sixth Embodiment

Next, a sixth embodiment of the present invention will be described. This embodiment is related to a configuration in which a reference value of proper exposure is automatically set (changed) based on luminance information of a subject. This embodiment can be realized using the image capture apparatus 100 having the configuration shown in FIG. 1, and thus will be described using the configuration of the image capture apparatus 100. In this embodiment, the system control unit 50 functions as a reference value automatic setting unit. In addition, also in this embodiment, an output level when a subject with reflectance of 18% is shot with proper exposure is used as a reference value of proper exposure.

If it is determined, from luminance information, that subject luminance is smaller than or equal to a threshold value for indoor photography (hereinafter, "indoor threshold value"), the system control unit 50 sets a reference value of proper exposure for indoor photography (hereinafter, "Indoor"). In addition, if it is determined, from luminance information, that subject luminance is larger than or equal to a threshold value for outdoor photography (hereinafter, "outdoor threshold value"), the system control unit 50 sets a reference value of proper exposure for outdoor photography (hereinafter, "Outdoor").

In addition, as an example, Indoor corresponds to an output level of 34%, and Outdoor corresponds to an output level of 45%. As long as Indoor is smaller than Outdoor, another value may be used. Furthermore, in the case where the indoor threshold value and the outdoor threshold value are different values, if the subject luminance takes a value that is larger than the indoor threshold value and smaller than the outdoor threshold value, the system control unit 50 sets a reference value of proper exposure through interpolation. Hereinafter, a reference value of proper exposure that is acquired through interpolation is referred to as an interpolated reference value.

In the case where an interpolated reference value is used as the reference value of proper exposure, the system control unit 50 causes the tentative reference value whose initial value is the current reference value, to gradually approximate the interpolated reference value, and, at a point in time when the tentative reference value is equal to the interpolated reference value, changes the reference value of proper exposure to the tentative reference value (=the interpolated reference value). However, if a user's operation of selecting a reference value of proper exposure is detected while the tentative reference value is approximating the interpolated reference value, the system control unit 50 prioritizes the reference value selected by the user (hereinafter, a user-selected reference value) over the interpolated reference value, and sets the reference value selected by the user as a new reference value.

FIG. 9 is a flowchart related to an operation of the image capture apparatus 100 in this embodiment automatically setting a reference value of proper exposure. For example, this processing can be repeatedly executed by the image capture apparatus 100 in parallel with an operation of shooting a moving image to be live-view-displayed or recorded, but can be executed at any other timing.

In step S901, the system control unit 50 obtains luminance information of a subject from the image processing unit 24. In this embodiment, the luminance information that is obtained from the image processing unit 24 by the system control unit 50 in order to set a reference value of proper exposure is an average luminance value of the entire image. Note that, in the case where the image processing unit 24 has applied face detection processing to the image and a face region has been detected, the system control unit 50 may obtain the average luminance value of the face region as luminance information. Note that luminance information of a subject that can be used for setting a reference value of proper exposure is not limited to these. For example, the average luminance value of a focus region in the image may be used, and other luminance information may also be used. Furthermore, luminance information of a subject does not need to be luminance information that is calculated from an image acquired by the image processing unit 24 performing shooting. Luminance information of a shooting scene may be obtained from an external device, for example.

In step S902, the system control unit 50 determines whether or not the luminance information obtained in step S901 is smaller than or equal to an indoor threshold value. If it is determined that the luminance information is smaller than or equal to the indoor threshold value, the system control unit 50 advances the procedure to step S903, and if it is not determined that the luminance information is smaller than or equal to the indoor threshold value (or if it is determined that the luminance information is larger than the indoor threshold value), advances the procedure to step S904.

In step S903, the system control unit 50 sets the reference value of proper exposure to Indoor, and ends the procedure.

In step S904, the system control unit 50 determines whether or not the luminance information obtained in step S901 is larger than or equal to an outdoor threshold value. If it is determined that the luminance information is larger than or equal to the outdoor threshold value, the system control unit 50 advances the procedure to step S905, and if it is not determined that the luminance information is larger than or equal to the outdoor threshold value (or if it is determined that the luminance information is smaller than the outdoor threshold value), advances the procedure to step S906.

In step S905, the system control unit 50 sets the reference value of proper exposure to Outdoor, and ends the procedure.

In step S906, the system control unit 50 sets the reference value of proper exposure to a value (an interpolated value) between Indoor and Outdoor, and ends the procedure.

Detailed processing in step S906 will be described with reference to the flowchart in FIG. 10.

First, in step S1002, the system control unit 50 calculates an interpolated reference value from the luminance information, the indoor threshold value, the outdoor threshold value, and the values of Indoor and Outdoor. Here, the interpolated reference value is assumed to be a linearly-interpolated value of Indoor and Outdoor, but may be a value acquired by performing certain weighting on Indoor and Outdoor. The system control unit 50 stores the calculated interpolated reference value in the memory 32, for example, without changing the current reference value.

FIG. 11 schematically shows a method for calculating an interpolated reference value in the case where the indoor threshold value is 100 ($cd/m^2$), the outdoor threshold value is 1000 ($cd/m^2$), and the luminance information is 550 ($cd/m^2$), for example. In addition, an expression for calculating an interpolated reference value is as follows.

$$\text{Interpolated reference value} = \{(45-34)/(1000-100)\} * (550-100) + 34 = 39(\%)$$

Returning to FIG. 10, in step S1003, the system control unit 50 determines whether or not a user operation of setting a reference value of proper exposure though the console unit 70 has been detected. If it is determined that an operation of setting a reference value of proper exposure has been detected, the system control unit 50 advances the procedure to step S1004, and if it is not determined that the operation has been detected (or if it is determined that the operation has not been detected), advances the procedure to step S1009.

In step S1004, the system control unit 50 determines whether or not the user-selected reference value is larger than Indoor and smaller than Outdoor. If it is determined that the user-selected reference value is larger than Indoor and smaller than Outdoor, the system control unit 50 advances the procedure to step S1005. In addition, if it is not determined that the user-selected reference value is larger than Indoor and smaller than Outdoor (or if it is determined that the user-selected reference value is smaller than or equal to Indoor, or is larger than or equal to Outdoor), the system control unit 50 advances the procedure to step S1006.

In step S1005, the system control unit 50 updates the current reference value stored in the memory 32 with the user-selected reference value in order to set the user-selected reference value as a new reference value for proper exposure, and ends the procedure.

In step S1006, the system control unit 50 determines whether or not the user-selected reference value is smaller than or equal to Indoor, and if it is determined that the user-selected reference value is smaller than or equal to Indoor, advances the procedure to step S1007, and if it is not determined that the user-selected reference value is smaller than or equal to Indoor (or if it is determined that the user-selected reference value is larger than or equal to Outdoor), advances the procedure to step S1008.

In step S1007, the system control unit 50 updates the current reference value stored in the memory 32 with Indoor, in order to set Indoor as a new reference value of proper exposure, and ends the procedure.

In step S1008, the system control unit 50 updates the current reference value stored in the memory 32 with Outdoor in order to set Outdoor as a new reference value of proper exposure, and ends the procedure.

On the other hand, in step S1009, the system control unit 50 increases or decreases, by a predetermined unit amount (1 step), a tentative reference value whose initial value is the current reference value of proper exposure, so as to approximate the interpolated reference value. Whether to increase or decrease the tentative reference value is determined by the system control unit 50 based on the magnitude relationship between the current reference value and the interpolated reference value.

Next, in step S1010, the system control unit 50 determines whether or not the tentative reference value has been approximated to be equal to the interpolated reference value, and if it is determined that the tentative reference value is equal to the interpolated reference value, advances the procedure to step S1011, and if it is not determined that the tentative reference value is equal to the interpolated reference value (or if it is determined that the tentative reference value is not equal to the interpolated reference value), returns the procedure to step S1003. Note that there are cases where the difference between the initial value of the tentative reference value and a target value (interpolated reference value) is indivisible by the magnitude of one step, and thus, in step S1010, whether or not the absolute value of the difference between the tentative reference value and the interpolated reference value is smaller than one step may be determined.

FIG. 12A shows examples of an exposure indicator 1201 that is displayed on the display unit 28, an indicator 1202 of an evaluation value of subject luminance, an indicator 1203 of a reference value of proper exposure, and an indicator 1204 of a tentative reference value. The system control unit 50 periodically updates the display of these values. Therefore, when the evaluation value (luminance information) of subject luminance, the reference value of proper exposure, and the tentative reference value vary, the display positions of corresponding indicators also vary. Note that the indicator 1204 of the tentative reference value is shown in FIG. 12A for convenience, but is not displayed when the processing in FIG. 10 is not being executed.

How the display in FIG. 12A changes when the processing described with reference to the flowchart in FIG. 10 is being executed will be described. Here, a case is envisioned in which, from the state where Indoor is set as a reference value of proper exposure, the processing in FIG. 10 is executed due to the luminance information having reached a value that is larger than the indoor threshold value and smaller than the outdoor threshold value.

In this case, at the time point in time when the processing in FIG. 10 was started, the reference value of proper exposure was set to Indoor, and thus the indicator 1203 of the reference value is displayed at a position corresponding to Indoor (output level of 34%). In addition, automatic exposure control has been performed for the current reference value of proper exposure, and thus the indicator 1202 of the evaluation value of subject luminance is displayed at horizontally same position as the indicator 1203 of reference value.

If the processing in FIG. 10 is started in this state, for example, in step S1002, the system control unit 50 displays the indicator 1204 of the tentative reference value at the same position as the indicator 1203 of the current reference value. If the processing continues without a reference value not being selected by the user, the system control unit 50 changes the display position of the indicator 1204 of the tentative reference value every time the tentative reference value varies when step S1009 is executed. Therefore, it appears, to the user, that the indicator 1204 of the tentative reference value is gradually moving as indicated by the arrow in FIG. 12A.

Assume that the user has set a desired reference value (the user-selected reference value) from a menu screen or the like before the tentative reference value reaches the interpolated reference value. In this case, in step S1005, S1007, or S1008, the system control unit 50 moves the indicator 1203 of the current reference value to a position corresponding to the user-selected reference value. In addition, the system control unit 50 ends display of the indicator 1204 of the tentative reference value. FIG. 12B shows the state where the display position of the indicator 1203 of the current reference value was updated in step S1005 in the case where the user-selected reference value is larger than Indoor and smaller than Outdoor.

On the other hand, if the tentative reference value reaches the interpolated reference value without a reference value being set by the user, the system control unit moves the indicator 1203 of the current reference value to a position corresponding to the interpolated reference value (an output level of 39%), in step S1011. In addition, the system control unit 50 ends display of the indicator 1204 of the tentative reference value.

As described above, in this embodiment, in the case of automatically setting the reference value of proper exposure to the interpolated reference value, instead of a predetermined reference values (Indoor and Outdoor), display for informing the user of change of the reference value and the direction of the change is performed. Therefore, it is convenient because it is possible for the user to know that the reference value of proper exposure is about to be changed, and if necessary, to manually set a desired reference value.

Other Embodiments

The above embodiments are particularly effective during shooting of a moving image, but may be executed during shooting of a still image. In addition, the present invention has been described based on exemplary embodiments, but the present invention is not limited to specific configurations described in these embodiments. The embodiments are intended to describe the invention, and are not intended to limit the invention. A person skilled in the art can implement deformations and modifications of the embodiments above within the scope of the invention stipulated in claims. These deformations and modifications are also included in the present invention. In addition, a portion or the entirety of two or more embodiments above may be combined as appropriate.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-011846, filed on Jan. 26, 2018, which is hereby incorporated by reference herein in its entirety.

What is claimed is:

1. An image capture apparatus comprising:
at least one processor that functions, when executes a program stored in a memory, as:
a setting unit configured to be able to set a reference value of proper exposure;
an obtaining unit configured to obtain luminance information of a subject;
a determination unit configured to determine exposure conditions based on the luminance information and the reference value; and
a control unit configured to control exposure conditions that include an exposure index of the image capture apparatus,
wherein the reference value is a value used as a reference exposure value from which exposure conditions are varied in an exposure compensation, and
wherein, in a case where the reference value is changed in a state where the exposure conditions have been manually set, the control unit changes the exposure index of the image capture apparatus so as to suppress an influence of the change in the reference value on brightness of an image that is acquired through shooting.

2. The image capture apparatus according to claim 1, wherein the setting unit can set the reference value with respect to a magnitude of an output level.

3. The image capture apparatus according to claim 2, wherein, in a predetermined conversion characteristic, a value of input data corresponding to the magnitude of the output level that has been set is used as the reference value.

4. The image capture apparatus according to claim 1, wherein the setting unit can set the reference value with respect to a magnitude of a dynamic range of luminance.

5. The image capture apparatus according to claim 4, wherein the magnitude of the dynamic range is represented as a maximum reflectance, and a value of input data corresponding to reflectance of 18% when a maximum value of the input data corresponds to the maximum reflectance is used as the reference value.

6. The image capture apparatus according to claim 1, wherein the setting unit can separately set the reference value for indoor photography and for outdoor photography.

7. The image capture apparatus according to claim 1, wherein the at least one processor further functions as:
a control unit configured to change an exposure index of the image capture apparatus, such that, in a case where the reference value has been changed, the changed reference value corresponds to brightness of a subject with reflectance of 18%.

8. The image capture apparatus according to claim 1, wherein the at least one processor further functions as:
a correction unit configured to convert input data that has a value corresponding to subject luminance into an output level in accordance with a predetermined conversion characteristic,
wherein the correction unit selectively uses one of a plurality of conversion characteristics for converting input data corresponding to a reference value of luminance for proper exposure, to an output level of a different magnitude.

9. The image capture apparatus according to claim 8, wherein the plurality of conversion characteristics are conversion characteristics according to which a dynamic range of luminance indicated by input data is the same.

10. The image capture apparatus according to claim 1, wherein, in a case where the reference value is changed, the determination unit changes the exposure conditions so as to acquire proper exposure that is based on the changed reference value.

11. The image capture apparatus according to claim 1, wherein the at least one processor further functions as:
a notification unit configured to notify a user of envisioned influence that change in the reference value has on image quality.

12. The image capture apparatus according to claim 1, wherein the setting unit sets the reference value that has been input according to a manual operation performed by a user.

13. The image capture apparatus according to claim 1, wherein the at least one processor further functions as:
an automatic setting unit configured to automatically set the reference value based on luminance information of a subject.

14. The image capture apparatus according to claim 13, wherein the automatic setting unit sets one of a plurality of predetermined reference values according to a result of comparison between the luminance information and a threshold value.

15. The image capture apparatus according to claim 13, wherein, in a case of setting an interpolated reference value that is acquired through interpolation of a plurality of predetermined reference values, the automatic setting unit notifies a user that the current reference value is to be changed, and then performs the setting.

16. The image capture apparatus according to claim 15, wherein, in a case where a user sets the reference value during the notification, the reference value that has been set by the user is prioritized over the interpolated reference value.

17. A method of controlling an image capture apparatus, comprising:
setting a reference value of proper exposure;
obtaining luminance information of a subject;
determining exposure conditions based on the luminance information and the reference value; and
controlling exposure conditions that include an exposure index of the image capture apparatus,
wherein the reference value is a value used as a reference exposure value from which exposure conditions are varied in an exposure compensation, and
wherein, in a case where the reference value is changed in a state where the exposure conditions have been manually set, the controlling changes the exposure index of the image capture apparatus so as to suppress an influence of the change in the reference value on brightness of an image that is acquired through shooting.

18. A non-transitory computer-readable storage medium storing a computer-executable program for executing a method of controlling an image capture apparatus, wherein the method comprises:
setting a reference value of proper exposure;
obtaining luminance information of a subject;
determining exposure conditions based on the luminance information and the reference value; and
controlling exposure conditions that include an exposure index of the image capture apparatus,
wherein the reference value is a value used as a reference exposure value from which exposure conditions are varied in an exposure compensation, and
wherein, in a case where the reference value is changed in a state where the exposure conditions have been manually set, the controlling changes the exposure index of the image capture apparatus so as to suppress an influence of the change in the reference value on brightness of an image that is acquired through shooting.

* * * * *